(12) United States Patent
Natesan et al.

(10) Patent No.: US 6,691,128 B2
(45) Date of Patent: Feb. 10, 2004

(54) NAVIGATION SYSTEM WITH DISTRIBUTED COMPUTING ARCHITECTURE

(75) Inventors: Senthil Natesan, Carol Stream, IL (US); Aaron Crane, Palatine, IL (US); Philip Robare, Chicago, IL (US)

(73) Assignee: Navigation Technologies Corp., Chicago, IL (US)

(*) Notice: Subject to any disclaimer, the term of this patent is extended or adjusted under 35 U.S.C. 154(b) by 283 days.

(21) Appl. No.: 09/838,094

(22) Filed: Apr. 19, 2001

(65) Prior Publication Data

US 2002/0169778 A1 Nov. 14, 2002

(51) Int. Cl.$^7$ .............................................. G06F 17/30
(52) U.S. Cl. ...................................... 707/102; 701/208
(58) Field of Search ........................... 707/102; 701/208

(56) References Cited

U.S. PATENT DOCUMENTS

| | | | | |
|---|---|---|---|---|
| 4,954,958 A | * | 9/1990 | Savage et al. ............. | 701/202 |
| 5,408,597 A | * | 4/1995 | Kita et al. ................. | 345/440 |
| 5,543,789 A | | 8/1996 | Behr et al. | |
| 5,559,707 A | * | 9/1996 | DeLorme et al. .......... | 701/200 |
| 5,636,122 A | * | 6/1997 | Shah et al. ................ | 701/207 |
| 5,777,618 A | * | 7/1998 | Kita et al. ................. | 345/418 |
| 5,848,373 A | * | 12/1998 | DeLorme et al. ........... | 701/200 |
| 5,944,769 A | | 8/1999 | Musk et al. | |
| 6,006,160 A | * | 12/1999 | Tamaki et al. ............. | 701/208 |
| 6,014,629 A | * | 1/2000 | DeBruin-Ashton ......... | 705/2 |
| 6,121,924 A | * | 9/2000 | Meek et al. ............... | 342/357.13 |
| 6,154,658 A | * | 11/2000 | Caci .......................... | 455/466 |
| 6,246,417 B1 | * | 6/2001 | Kambe et al. ............. | 345/619 |
| 6,246,958 B1 | | 6/2001 | Hirono | |
| 6,487,495 B1 | * | 11/2002 | Gale et al. ................. | 701/209 |
| 6,513,019 B2 | * | 1/2003 | Lewis ......................... | 705/35 |
| 6,539,419 B2 | * | 3/2003 | Beck et al. ................. | 709/204 |
| 6,546,334 B1 | | 4/2003 | Fukuchi et al. ............. | 701/208 |
| 2001/0054008 A1 | * | 12/2001 | Miller et al. ............... | 705/26 |

FOREIGN PATENT DOCUMENTS

| | | | | |
|---|---|---|---|---|
| WO | WO 96/11380 | * | 4/1996 | ............ G01C/21/20 |
| WO | WO 98/45823 | | 10/1998 | |
| WO | WO 00/46776 | | 8/2000 | |

* cited by examiner

*Primary Examiner*—Wayne Amsbury
(74) *Attorney, Agent, or Firm*—Jon D. Shutter; Frank J. Kozak; Lawrence M. Kaplan

(57) ABSTRACT

A system and method for providing geographic data to end users' computing platforms. A server maintains downloadable geographic data that are organized into pre-computed parcels that correspond to pre-determined sub-areas into which the entire geographic region serviced by the server is divided. The server responds to requests from the end users' computing platforms for navigation services and data by sending selected pre-computed parcels of geographic data to the end users' computing platforms. The end users' computing platforms store the pre-computed parcels received from the server in a cache memory. The end users' computing platforms use the data in the pre-computed parcels to provide navigation-related features locally.

45 Claims, 13 Drawing Sheets

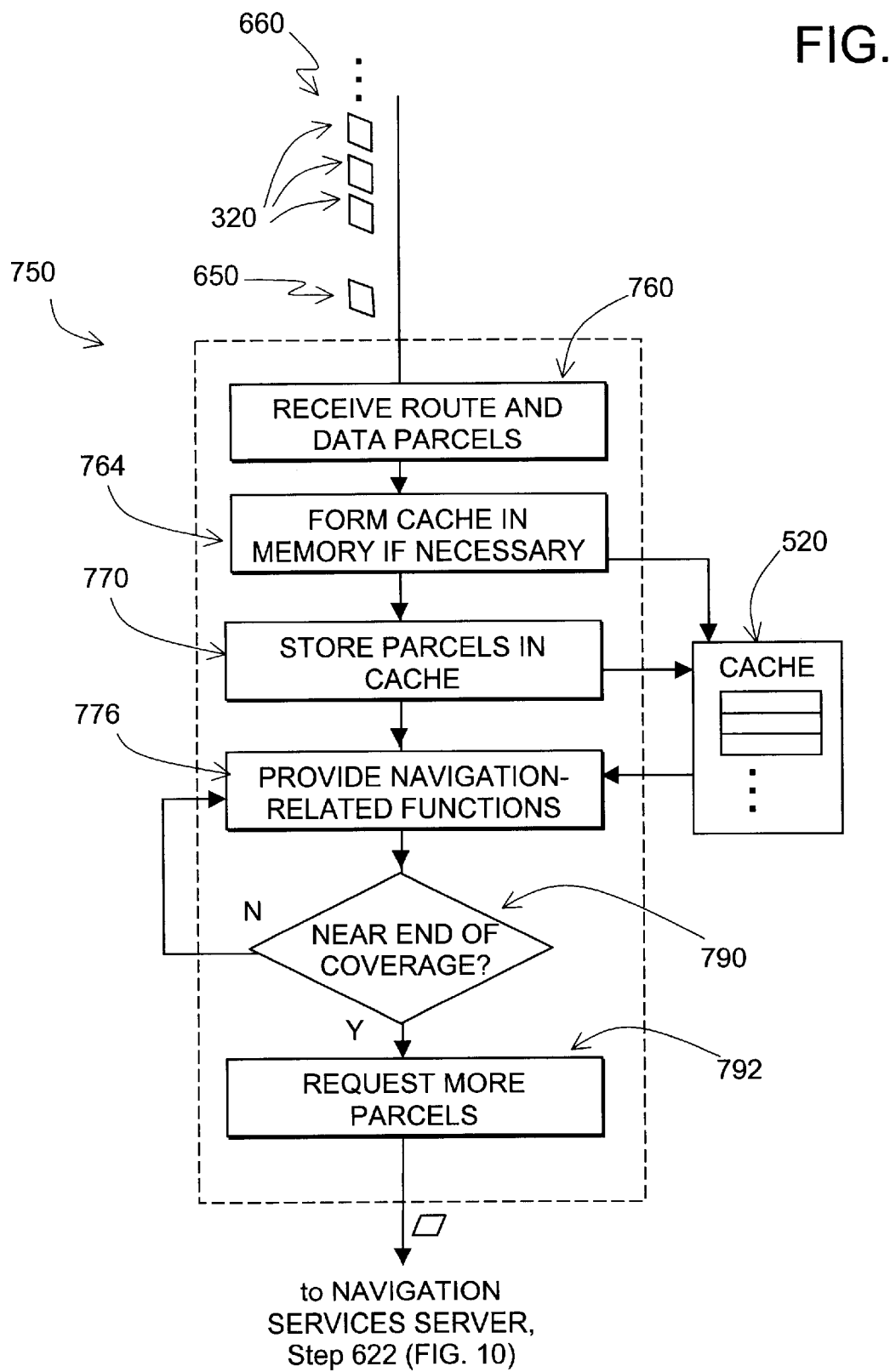

NAVIGATION SYSTEM WITH DISTRIBUTED COMPUTING ARCHITECTURE

BACKGROUND OF THE INVENTION

The present invention relates to a system that provides navigation-related services and data to end users throughout a geographic region, and more particularly, the present invention relates to a system that includes a centrally-located server that has a geographic database associated therewith and that provides navigation-related services and data to end users' computing platforms that are located throughout a serviced geographic region.

Navigation systems provide various useful features, such as calculating routes to desired destinations, providing guidance for following calculated routes, displaying maps, and so on. There are various computer architectures for navigation systems that deliver navigation-related and map-related features. In one type of architecture for a navigation system, end users (such as vehicle drivers) have local navigation system units. These end users' local navigation system units obtain geographic data from a remotely-located geographic database. The remotely-located geographic database contains a relatively large amount of geographic data. A server associated with the remotely-located geographic database handles requests for navigation-related or map-related data from end users' local navigation system units. When an end user's local navigation system unit requests data, the server accesses the geographic database associated therewith to obtain the necessary data to respond to the request and then sends the data to the requesting end user's local navigation system unit.

This type of navigation system architecture provides several advantages. One advantage relates to providing updated geographic data. There is a continuing need to update the geographic data used by a navigation system. For example, new streets are built, road construction closes roads, detours are established, new businesses open, posted speed limits change, new turn restrictions are established at intersections, streets are renamed, and so on. These kinds of changes can affect travel through a geographic region. Accordingly, the geographic data used by a navigation system should be updated on a regular basis in order to accurately reflect changes in the represented geographic features. A computer architecture in which individual local navigation system units obtain geographic data from a single geographic database affords an advantage with respect to the updating of the geographic data. With a computer architecture in which individual local navigation system units obtain data from a single geographic database associated with a central server, updates need to be applied only to the central database.

Although there are advantages associated with a navigation system architecture in which individual navigation system units obtain data from a single geographic database associated with a central server, there are considerations that need to be addressed. One consideration relates to providing data for a variety of different computer platforms used by end users. It is preferable that the central server support various different types of end user computer platforms. These different end user computer platforms may have different resources, such as different amounts of memory, different processor speeds, different operating systems, etc. Some of these different types of end user computer platforms may include general purpose computing devices that run navigation applications. Other end user computer platforms may include dedicated devices, such as in-vehicle navigation systems. Some of these different end user computer platforms may provide both audio and visual information to an end user, whereas other end user computer platforms provide only audio or only video. It would be preferable that each computer platform receive geographic data that are appropriate for the resources of the platform. This includes sending sufficient data in order to utilize the available resources of the computing platform in a meaningful way, but not sending data that cannot be used on the platform.

Thus, there is a need for an improvement that allows a server that provides navigation-related services and data to support different kinds of end user computing platforms.

Further, in a navigation system architecture in which data are transmitted from a central server to end users' computing platforms, there is a need for an improvement that allows data to be managed efficiently on both the server and on the end users' computing platforms.

SUMMARY OF THE INVENTION

To address these and other objectives, the present invention comprises a system and method for providing navigation-related services to end users' computing platforms. A server maintains downloadable geographic data that are organized into pre-computed parcels that correspond to pre-determined sub-areas into which the entire geographic region serviced by the server is divided. The server responds to requests for navigation services and data by sending selected pre-computed parcels of geographic data to end users' computing platforms. Each of the end users' computing platforms stores the parcels received from the server in a memory cache. The end users' computing platforms use the data in the parcels to provide navigation-related features locally.

BRIEF DESCRIPTION OF THE DRAWINGS

FIG. 13 is a flowchart of the steps performed on the end user's computing platform after the navigation services server has performed the process in FIG. 10.

DETAILED DESCRIPTION OF THE PRESENTLY PREFERRED EMBODIMENTS

I. Overview of Distributed Navigation System

Figure 1:
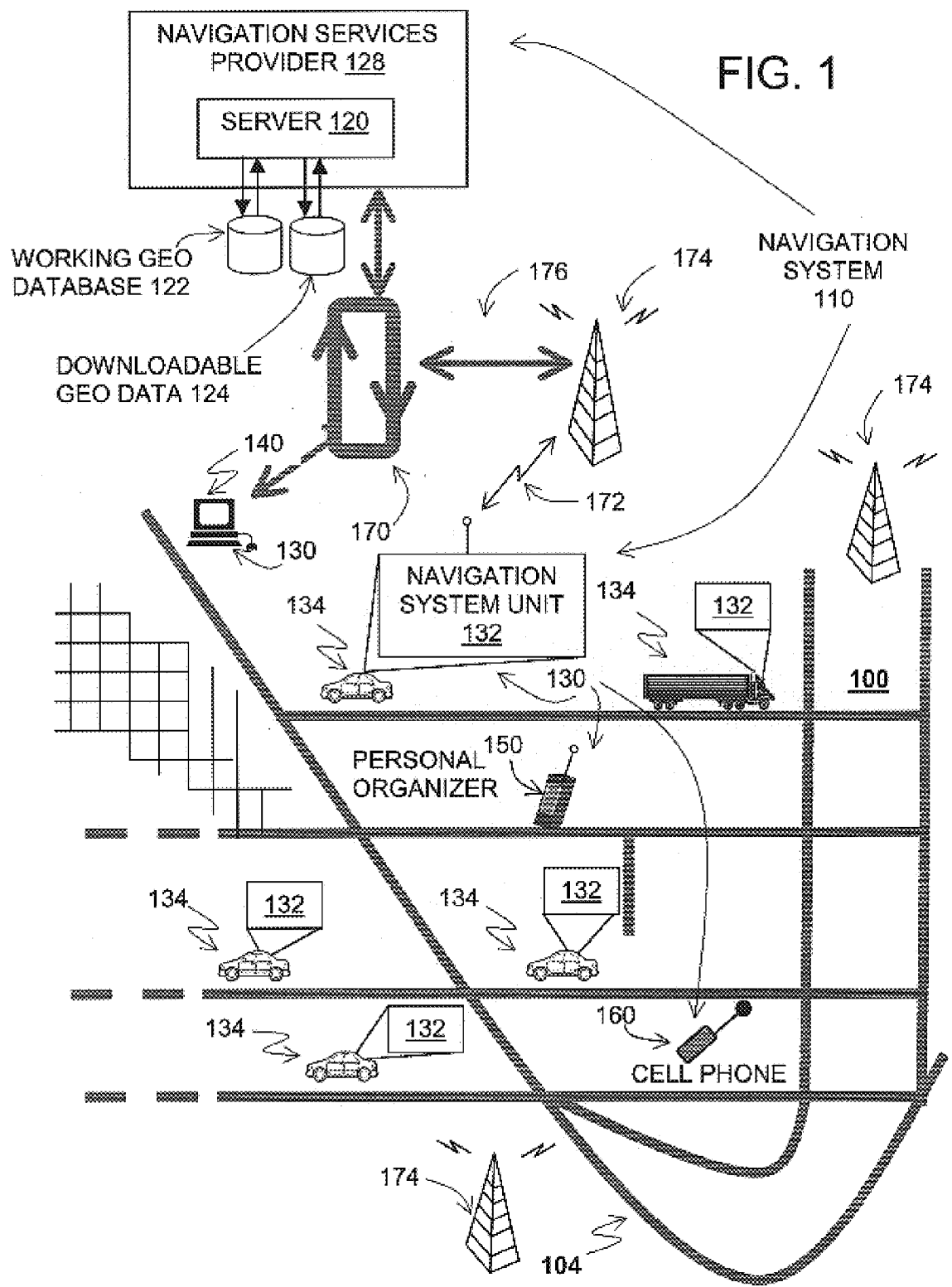
FIG. 1 is a diagram illustrating components of a navigation system that sends geographic data to end users' computing platforms located throughout a geographic region.

FIG. 1 shows a geographic region 100. The geographic region 100 may correspond to a metropolitan or rural area, a state, a country, or combinations thereof, or any other area of comparable size. Located in the geographic region 100 is a road network 104.

A navigation system 110 serves end users (e.g., vehicle drivers and passengers, as well as other persons) in the geographic region 100. The navigation system 110 is used by the end users to obtain navigation-related and map-related services with respect to the geographic region 100. The navigation-related and map-related services include information about travel along the road network 104, including route calculation and guidance, people and business finding services (e.g., electronic yellow and white pages), maps, point of interest searching, destination selection, and so on.

The navigation system 110 is a combination of hardware, software and data. The navigation system 110 includes remote components (i.e., hardware, software or data located at a central location remote from the end users) and local components (i.e., hardware, software, or data located physically with each end user).

Included among the remote components of the navigation system 110 is a navigation services server 120. Associated with the navigation services server 120 are a working geographic database 122 and a downloadable geographic data storage (or repository) 124. The navigation services server 120, the working geographic database 122 and the downloadable geographic data storage 124 are maintained and operated by a navigation services provider 128.

The local components of the navigation system 110 include the various computer platforms 130 operated by the end users to request and obtain navigation-related and map-related features and geographic data from the navigation services provider 128. These various computer platforms 130 (also referred to as "end user computing platforms" or "client computing platforms") may include navigation system units 132 located in vehicles 134, personal computers 140, personal organizers (e.g., PDAs, PalmPilot®-type devices) 150, portable phones 160, or other types of computing devices that have the appropriate hardware and software to access the navigation services provider 128 over a data network 170.

The data network 170 may use any suitable technology and/or protocols that are currently available, as well as technology and/or protocols that become available in the future. For example, the data network may use WAP, TCP/IP, etc. More than one protocol may be used in the data network 170 with appropriate conversions.

The data network 170 may be part of, or connected to, the Internet.

The network 170 may include a wireless portion 172. The wireless portion 172 of the data network 170 enables two-way communication between the mobile end user computing platforms 130 and the service provider 128. The wireless portion 172 may be implemented by any suitable form of wireless communication, including cellular, PCS, satellite, FM, radio, or technologies that may be developed in the future. The wireless portion 172 may include one or more transmitters 174, such as a transponder tower, an antenna tower, an FM tower, satellites, or other suitable means. The transmitters 174 include an appropriate communication link 176 to the network 170 and/or service provider 128. This link 176 may be land-based or may be wireless. The transmitters 174 include suitable technology that enables two-way communication between the service provider 128 and the mobile end user computing platforms 130.

One of the features of the navigation system 110 of FIG. 1 is that it accommodates different types of end user computing platforms 130. The navigation system 110 of FIG. 1 allows end users who have different types of computing platforms 130 to obtain navigation services from the navigation services provider 128 and to obtain and use geographic data provided from the navigation services provider 128.

II. The Navigation Services Server

A. Overview

Figure 2:
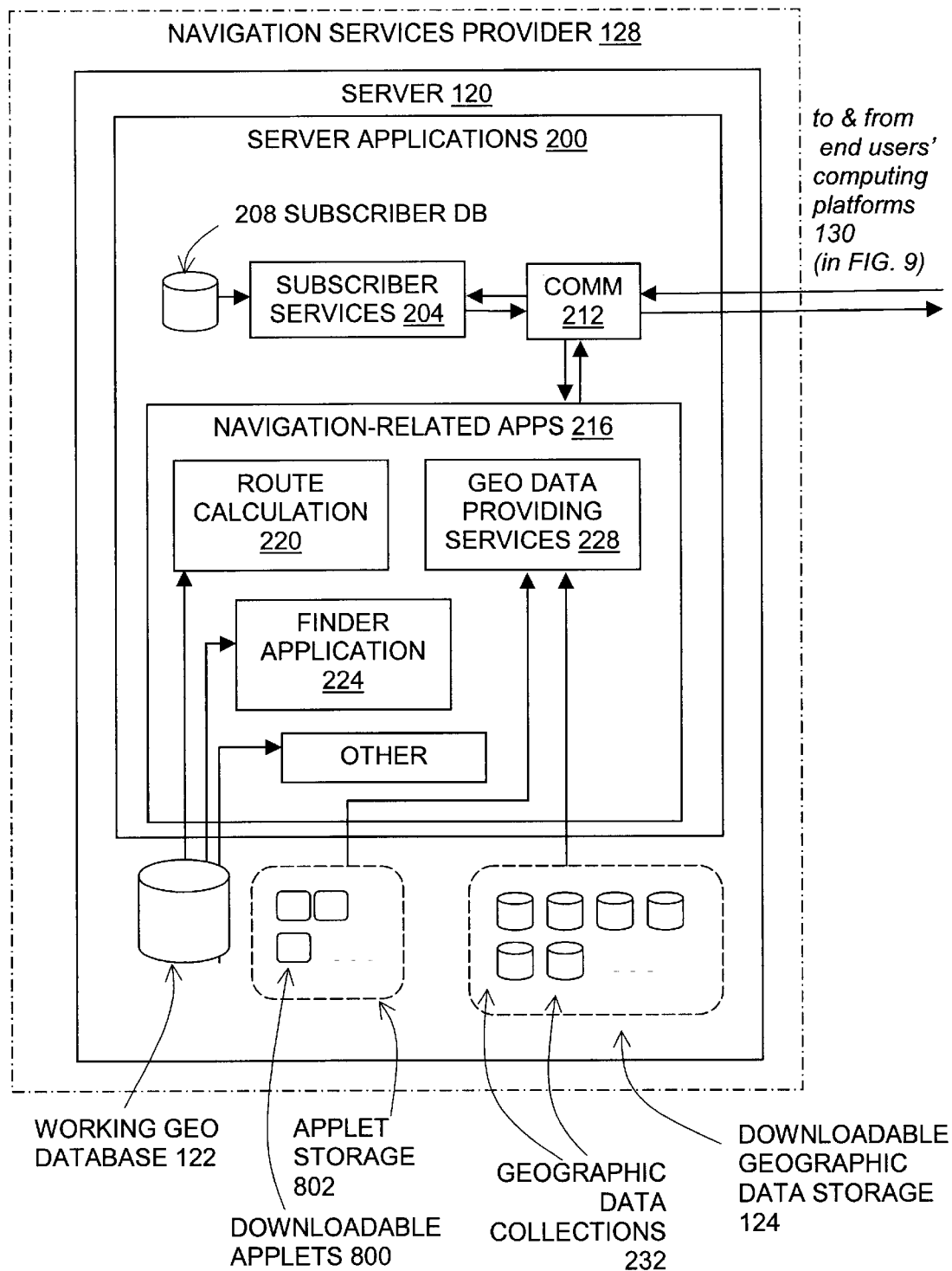
FIG. 2 is a block diagram showing components of the navigation services provider in FIG. 1.

FIG. 2 is a block diagram showing some of the components of the navigation services provider 128. Included on the navigation services server 120 of the navigation services provider 128 are server applications 200. One of the server applications 200 is a subscriber services application 204. In order to use some or all of the other services provided by the navigation services provider 128, end users may be required to be subscribers. The subscriber services application 204 provides services that support this function. Some of the subscriber services include enrollment, payments, renewals, confirmation of subscriber status, targeted advertising, and so on. The subscriber services application 204 maintains and uses a subscriber database 208 that contains various kinds of information concerning the various subscribers.

Another of the server applications 200 is a communications application 212. The communications application 212 interfaces with the data network (170 in FIG. 1) in order to receive messages from and send messages to the end users. The communications application 212 may also maintain and manage communications sessions with the end users.

Included among the server applications 200 are navigation-related applications 216. The navigation-related applications 216 use the working geographic database 122 associated with the navigation services server 120 in order to provide the various different types of navigation-related services. One of the navigation-related applications 126 is a route calculation application 220. Given data that identify the positions of an origin and destination, the route calculation application 220 calculates a route between the origin and the destination. The route calculation application 220 may use any of various means or algorithms for this purpose. Methods for calculating routes are disclosed in U.S. Pat. No. 6,192,314, the entire disclosure of which is incorporated by reference herein. For example, the method for calculating routes may include either the A* algorithm or the Dykstra algorithm. (The methods disclosed in the aforementioned patent represent only some of the ways that routes can be calculated and the claimed subject matter herein is not limited to any particular method of route calculation. Any suitable route calculation method now known or developed in the future may be employed.)

Regardless of the method used, the route calculation application 220 provides an output in the form of a list identifying a continuous series of roads (or segments thereof) that form a legally valid solution route between an origin and a destination. A "legally valid solution route" conforms to known traffic restrictions, such as one way streets, turn restrictions, etc. The method used by the route calculation application 220 may be designed to optimize the solution route to meet one or more predetermined criteria. Such criteria may include the least travel time, the shortest distance, the fewest turns, etc. If the method used by the route calculation application 220 is designed to find a solution route that is optimized for one or more criteria, then the solution route also ideally meets these one or more criteria.

Another of the navigation-related applications 216 is a business and person finder application 224. The business and person finder application 224 includes yellow and white pages-types of functions. The business and person finder application 224 finds the location or address of a specific business or person, or possibly other information about a specific business or person. The business and person finder application 224 also provides for finding locations or addresses of categories of businesses or persons based upon various criteria. For example, the business and person finder application 224 provides for finding all the restaurants of a specific ethnic type (e.g., Chinese) or chain (e.g., McDonald's) within specified distance (e.g., 5 miles) of a specified location (e.g., an end user's location). The business and person finder application 224 can assist end users to find businesses, persons, or points of interest that can be used as destinations to which the route calculation application 220 can then determine solution routes.

In order to provide navigation-related features, the route calculation application 220 and the finder application 224 use data from the working geographic database 122. The working geographic database 122 includes data representing the roads and intersections in the geographic region (100 in FIG. 1) and also includes information relating to the represented roads and intersections, such as turn restrictions at intersections, speed limits along the roads, street names of the various roads, address ranges along the roads, and so on. The working geographic database 122 also contains information about points of interest, businesses and other information. The working geographic database 122 may be organized to facilitate performing navigation-related functions. Methods of organizing a geographic database to enhance the performance of certain navigation-related functions are described in U.S. Pat. Nos. 5,974,419, 5,968,109 and 5,953,722, the entire disclosures of which are incorporated by reference herein.

Another of the navigation-related applications 216 on the navigation services server 120 is a geographic data providing application 228. The geographic data providing application 228 manages the downloading of geographic data to end users' computing platforms 130. According to one embodiment of the navigation system (110 in FIG. 1), certain navigation-related functions are performed for the end users remotely on the navigation services server 120 and other navigation-related functions are performed for the end users locally on their respective end user computing platforms 130. For example, according to one embodiment, route calculation is performed on the navigation services server 120 in order to take advantage of the latest traffic information. Route guidance is performed locally on the end users' respective computing platforms 130 in order to present the information in a manner preferred by each end user and compatible with the resources of each end user's respective computing platform.

In order to perform certain navigation-related functions locally on an end user's computing platform, a navigation application on the end user's computing platform may require geographic data. In a present embodiment, each end user's computing platform obtains from the navigation services server 120 the geographic data needed to perform certain navigation-related functions locally. The data that the navigation services server 120 sends to the end users' computing platforms 130 are obtained from the downloadable geographic data storage 124. The geographic data providing application 228 on the navigation server 120 manages the provision of geographic data from the downloadable geographic data storage 124 to the end users' computing platforms 130.

The geographic data providing application 228 performs several functions. One function performed by the geographic data providing application 228 is determining the appropriate data to send from the downloadable geographic data storage 124 to an end users' computing platform. This determination can take into account several factors. According to one embodiment, an end user's computing platform identifies a collection of geographic data. The navigation services provider 128 may maintain different collections 232 of geographic data in the downloadable geographic data storage 124. Each separate collection 232 is a separate representation of the entire geographic region (100 in FIG. 1). The composition of these different collections 232 is explained in more detail below. Upon a determination of the collection 232 of geographic data from which to send data, the geographic data providing application 228 selects particular portions of data from the collection 232 and sends the selected portions of data to the end user's computing platform, as described in more detail below.

According to an alternative embodiment, the geographic data providing application 228 may determine the appropriate collection 232 of geographic data from which to select data to send to a particular end user by referring to the subscriber database 208. The subscriber database 208 may maintain information that identifies the collection of geographic data from which data is to be selected for sending to each end user. According to another alternative embodiment, the geographic data providing application 228 may determine the appropriate collection of geographic data from which to select data to send to a particular end user by any other means.

After determining the collection 232 from the downloadable geographic data storage 124 from which geographic data are to be selected to send to an end user's computing platform, the particular portions of geographic data to be sent are selected. In order to perform this function, the geographic data providing application 228 takes into account (1) the location of the end user's computing platform, (2) where the end user's platform is going, and (3) other factors. If the end user is following a route calculated by the route calculation application 220, the geographic data providing application 228 selects data that represents an area along the route. An area along a route may be referred to as a "strip map." The dimensions of the strip map may be determined by the geographic data providing application 228. This determination may take into account specification of strip map dimensions by the end user. Alternatively, the geographic data providing application 228 may determine appropriate strip map dimensions based upon stored information about the end user's preferences or computer platform resources. This stored information may be maintained in the subscriber database 208.

B. Downloadable Geographic Data

As mentioned above, the geographic data providing application 228 determines which data to send to the end users' computing platforms 130. The data that the geographic data providing application 228 sends to the end users' computing platforms are obtained from the downloadable geographic data storage 124 maintained on the navigation services server 120. In order to facilitate the downloading of data from the navigation service server 120 to the end users' computing platforms 130, the data are organized into one or more predetermined collections 232. In addition, each collection 232 of data in the downloadable geographic data storage 124 is organized into a plurality of groupings (or "parcels"). In one embodiment, the data contained in each parcel are determined spatially, i.e., the data in each parcel represent geographic features that are located close to each other. More specifically, the data contained in each parcel represent the geographic features contained in a separate, distinct one of a plurality of separate geographic areas into which the entire represented geographic region (100 in FIG. 1) is divided.

As stated above, according to this embodiment, the downloadable geographic data storage 124 includes several different collections 232. Each of these collections 232 comprises a separate representation of the entire geographic region 100. Each of these collections 232 is organized into a plurality of parcels.

Figure 3:
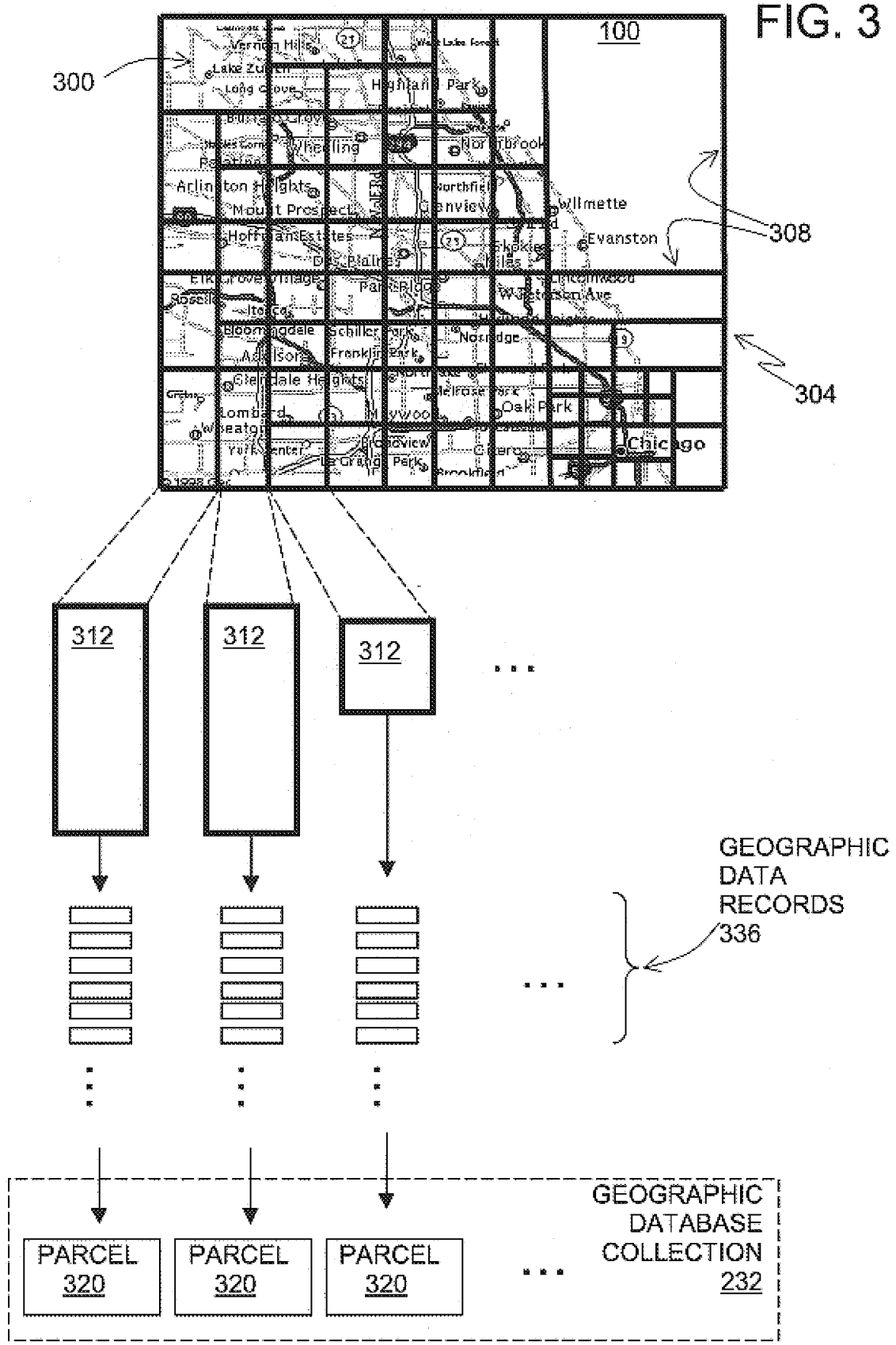
FIG. 3 shows a map of the geographic region in FIG. 1 and is used to describe an embodiment for organizing the downloadable geographic data stored on the navigation server.
Figure 4:
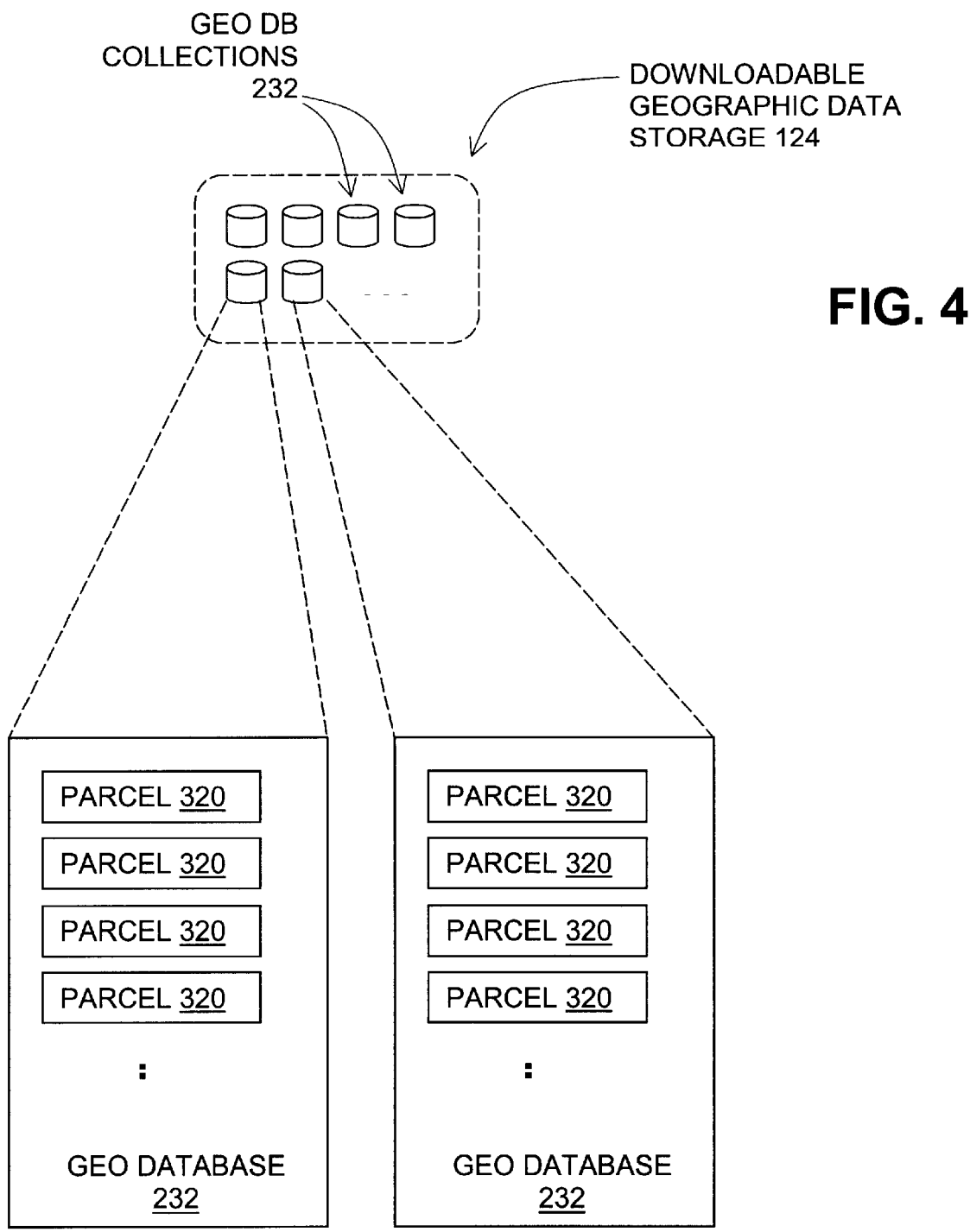
FIG. 4 is a diagram that shows components of several of the collections of geographic data that are contained in the downloadable geographic data storage shown in FIG. 2.

FIGS. 3 and 4 illustrate how the data contained in each collection 232 of the downloadable geographic data storage 124 are organized, according to one embodiment. FIG. 3 shows the map 300 of the geographic region 100, previously illustrated in FIG. 1. In FIG. 3, a grid 304 overlays the map 300 representing of the geographic region 100. The grid 304 is formed of grid lines 308. The grid lines 308 divide the represented geographic region 100 into a plurality of areas 312. In this embodiment, the areas 312 are rectangular; however, in alternative embodiments the areas 312 may have other shapes. The grid lines 308 of the grid 304 represent the boundaries of the areas 312. These areas 312 may have different dimensions, as shown in FIG. 3. Alternatively, the areas 312 may all have the same dimensions. The dimensions of the areas 312, as well as whether all the areas 312 have the same dimensions, depend upon the procedure used for organizing the data that represent the geographic features contained in these geographic areas into parcels. Likewise, the locations of the boundaries of the areas 312 depend on the procedure used for organizing the data that represent the geographic features contained in these geographic areas into parcels. Methods for determining the boundaries of areas for forming parcels are disclosed in U.S. Pat. No. 5,974,419, the entire disclosure of which is incorporated by reference herein.

In forming each parcel 312, the individual data records 336 that represent the geographic features that are encompassed within each separate area 312 are gathered together in a separate parcel 320 (or grouping) of data. Thus, each parcel 320 of data (in each collection 232) contains all the data records 336 that represent the geographic features encompassed within a corresponding geographic area 312. Thus, all the geographic areas 312 (corresponding to all the parcels 320 in a collection 232) make up the entire region 100. Thus, each parcel 320 of data may contain a plurality of data records 336 that represent the roads, intersections, points of interest, and other features located within the geographic area 312 corresponding to the parcel.

According to one embodiment, all the parcels 320 within each collection 232 have a uniform parcel size. For example, each parcel 320 of data may have a size of 1K, 2K, 4K, 8K, 16K, 32K, and so on. The parcel size for each collection 232 may be determined based upon several factors, including memory resources of the end users' computing platforms that are expected to use the data. According to this embodiment, the parcels 320 in one collection 232 may have a different size than the parcels 320 in another collection 232. For example, one collection 232 may have parcels that are 32K in size whereas another of the collections 232 may have parcels that are 16K in size.

As shown in FIGS. 3 and 4, each of the collections 232 includes a plurality of parcels 320. Each of the parcels 320 in a collection 232 corresponds to a separate one of the geographic areas 312 located within the entire geographic region 100. In the downloadable data storage 124, each of the collections 232 and each of the parcels 320 in each of the collections is pre-computed. In other words, the determination and formation of each collection 232 and the determination and formation of all the parcels 320 that make up each collection 232 are performed prior to any of the data in the downloaded data storage 124 being made available for downloading to any of the end users' computing platforms 130. In this manner, the determination of which data to send to an end user is facilitated. When an end user requires data for use locally in his/her computing platform, the navigation services server 120 does not have to determine which specific data records the end user may need and then send these data records to the end user. Instead, the navigation services server 120 determines which geographic areas 312 are required by the end user and then sends the entire parcels 320 that contain the data that represent all the geographic features in these geographic areas 312 to the end user. The parcels 320 that are sent to the end user represent a clip or slice of all the data that represent the geographic region. These parcels 320 include all the individual data records that may be needed by the end user. This organization and process facilitate operations on the navigation services server 120. The geographic providing application 228 on the navigation services server 120 determines whether the end user needs any data corresponding to a defined geographic area 312 corresponding to a parcel, and if so, sends the entire parcel corresponding to the geographic area 312 to the end user. This organization and process also facilitate operations on the end user's computing platform by providing a way to manage memory resources, as explained in more detail below.

Except as noted below, when data are downloaded from the downloadable data storage 124 to the end users' computing platforms, the data are downloaded in whole parcels. This means that all the data records 336 that represent geographic features encompassed within each geographic area 312 are accessed together as a group. Thus, a parcel 320 represents a quantity of data records that are downloaded at the same time for use in the end user's computing platform. When a parcel of data is sent to an end user's computing platform, all of the data records in the parcel are available in the end user's computing platform. In one embodiment, all of the data records in a parcel are maintained in the memory of the end user's computing platform system at the same time.

C. Different Types of Parcels

As mentioned above, the downloadable geographic data storage 124 contains different collections 232 of geographic data. These different collections 232 all represent the same geographic region (100 in FIG. 1), but may include different types of data (or data organized differently). These different collections 232 of data are all organized into parcels, as described above. As stated above, the parcels 232 in a collection preferably conform to a uniform parcel size. However, the uniform size of the parcels in one collection 232 may be different than the uniform size of the parcels in another collection 232. The contents of some of the collections 232 are described below.

(1) First Collection of Downloadable Geographic Data

Figure 5:
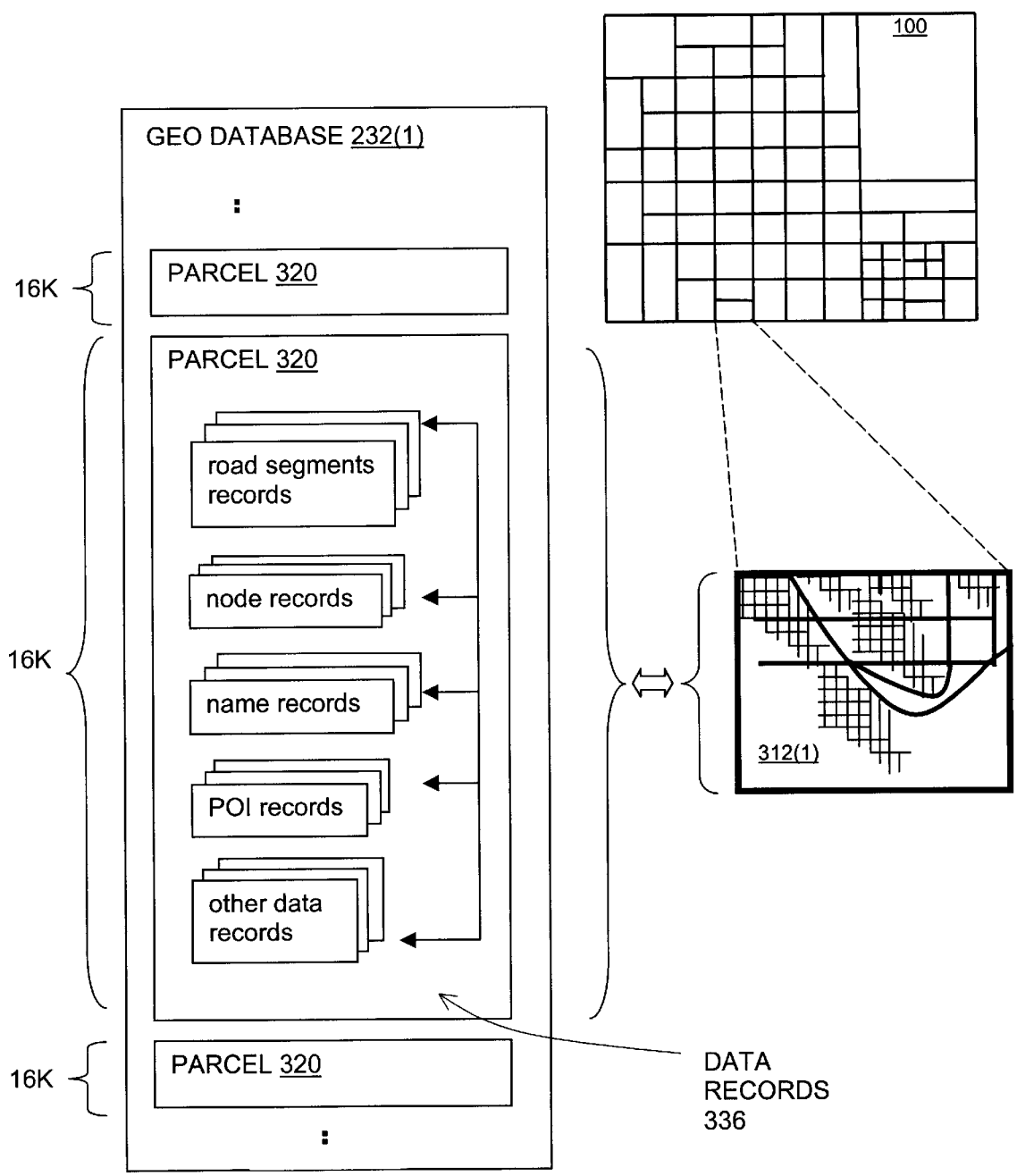
FIG. 5 is a diagram showing components of one of the collections of geographic data contained in the downloadable geographic data storage shown in FIG. 4.

FIG. 5 is a diagram used to illustrate the contents of one of the parcels 320 of geographic data 336 in one of the collections 232(1). The data 336 in the parcel 320 correspond to one of the geographic areas 312(1). In this embodiment, the parcel 320 contains all the data 336 that represent all the features contained in the geographic area 312(1). As an example, the parcel 320 contains data that represents all the roads located in the geographic area 312(1) corresponding to the parcel 320. Each road is represented as a series of connected segments, wherein a segment corresponds to a portion of a road between adjacent intersections along the road or between an intersection and a location at which the road dead ends. In this embodiment, each road segment is represented by a separate data entity (or data record). Each data record that represents a road segment includes (or points to) data about the represented road segment, such as the speed limit (or speed category) of the road segment, the functional class (i.e., rank) of the road segment, the number of lanes along the road segment, and so on.

A data record that represents a road segment also includes data indicating the location of the road segment. In one embodiment, this information includes a reference to node records that represent the end points of the road segment. Associated with the node records are data indicating the locations (e.g., latitude, longitude, and optionally, altitude) of the road segment end points (i.e., nodes). For road segments that are not straight, additional data are included to indicate the shape of the road segment. In one embodiment, shape point data are used for this purpose. A shape point identifies a position (e.g., latitude, longitude, and optionally, altitude) of a location along a road segment between the end points thereof. Using one or more shape points, the shape of an other-than-straight road segment can be represented.

A record that represents a road segment also includes data indicating the name(s) of the road segment. In one embodiment, this information includes a reference to one or more name records. In this embodiment, the name records for the roads and other named geographic features are included in the same parcel.

In the embodiment shown in FIG. 5, the parcel 320 also includes point of interest data. The point of interest data includes information about points of interest. Points of interest include businesses, public facilities, etc. The point of interest data includes information about the represented points of interest, such as the names, type (e.g., hotel, restaurant, chain, museum, police station, etc.), address, phone, etc. In this embodiment, the data records for the point of interests contained in the geographic area are included in the same data parcel with the road segment data, the node data and the name data.

Figure 6:
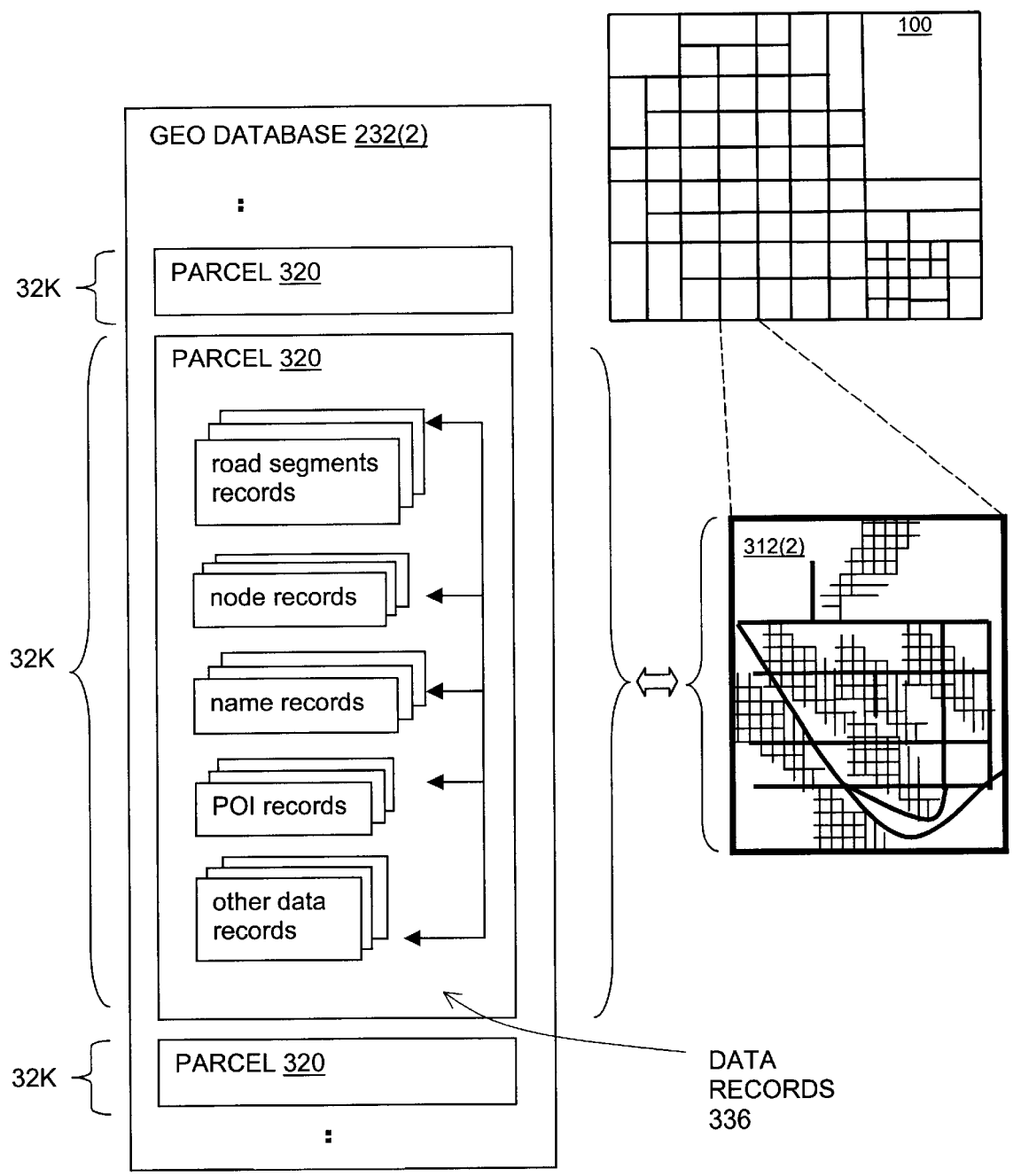
FIG. 6 is a diagram showing components of another of the collections of geographic data contained in the downloadable geographic data storage shown in FIG. 4.

In the collection 232(1) of data in FIG. 5, all the parcels are 16K in size (although any other data size may be used). FIG. 6 shows another collection 232(2) of data. In FIG. 6, the collection 232(2) is divided into parcels 320 that include the same kinds of data, e.g., road segment records, node records, name records, and point of interest records, etc. However, in FIG. 6, the parcels 320 that form the collection 232(2) have a different size than the parcels in the collection 232(1) in FIG. 5. The parcels in the collection 232(2) in FIG. 6 are each 32K in size. Because each parcel 320 in FIG. 6 contains more data than each parcel in FIG. 5, each parcel can represent a larger geographic area. Thus, as shown in FIG. 6, the geographic area 312(2) corresponding to the parcel 320 is larger in dimension than the geographic area 312(1) corresponding to the parcel 320 in FIG. 5.

Figure 7:
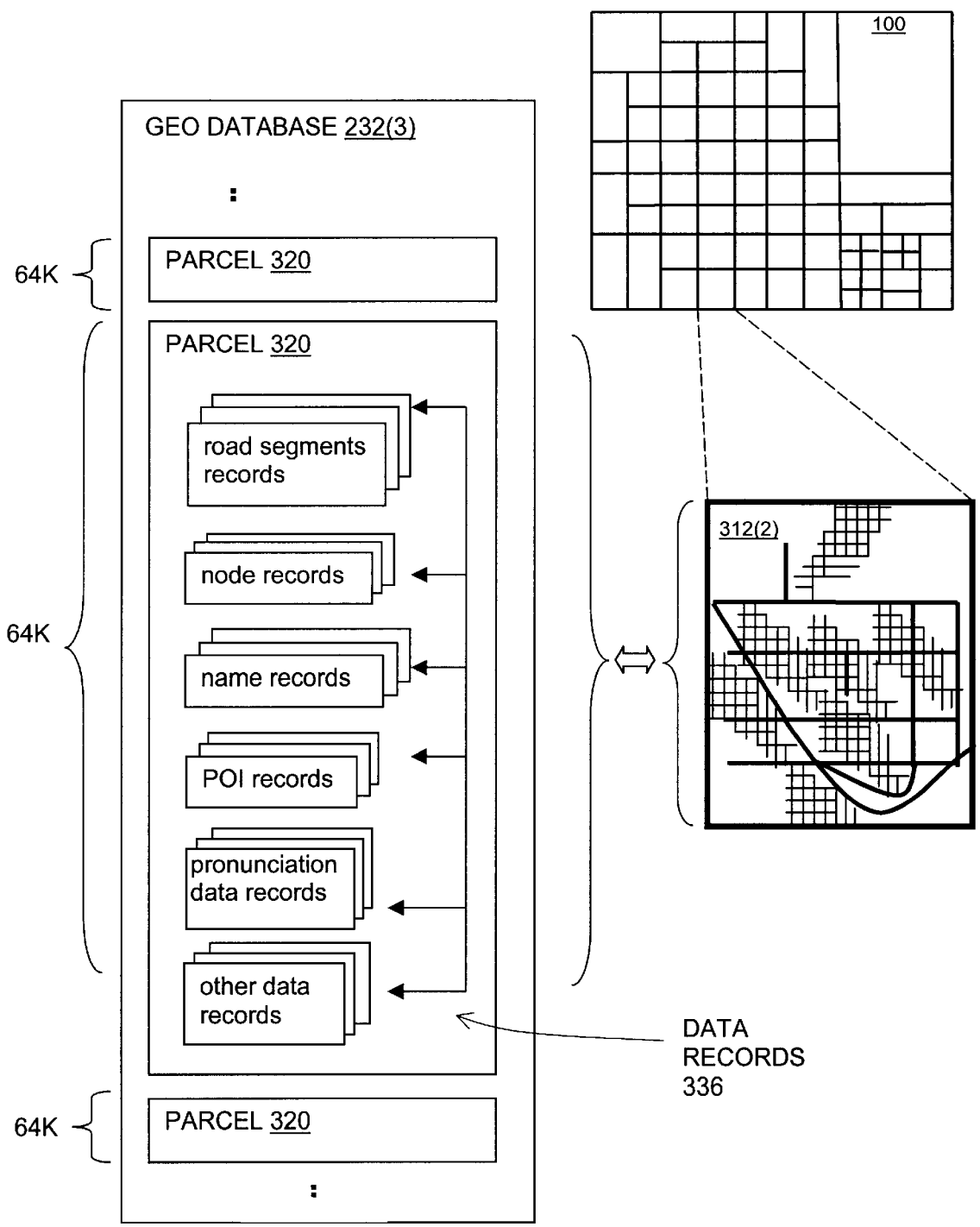
FIG. 7 is a diagram showing components of another of the collections of geographic data contained in the downloadable geographic data storage shown in FIG. 4.

FIG. 7 shows another collection 232(3) of data. The collection 232(3) of data shown in FIG. 7 includes the same kinds of data, e.g., road segment records, node records, name records, and point of interest records, etc., as in the collections 232(1) and 232(2) shown in FIGS. 5 and 6, respectively. In addition, in the collection 232(3) of data in FIG. 7, each parcel 320 also includes pronunciation data. The pronunciation data corresponds to the names of the geographic feature and/or points of interest in the represented geographic area. The pronunciation data includes phonetic representations of the names of the geographic feature and/or points of interest in the parcel 320 so that these names can be audibly reproduced using appropriate hardware and software in the end user's computing platform 130. In the collection 232(3) of data in FIG. 7, each parcel 320 contains 64K of data, although any other data size may be used.

Figure 8:
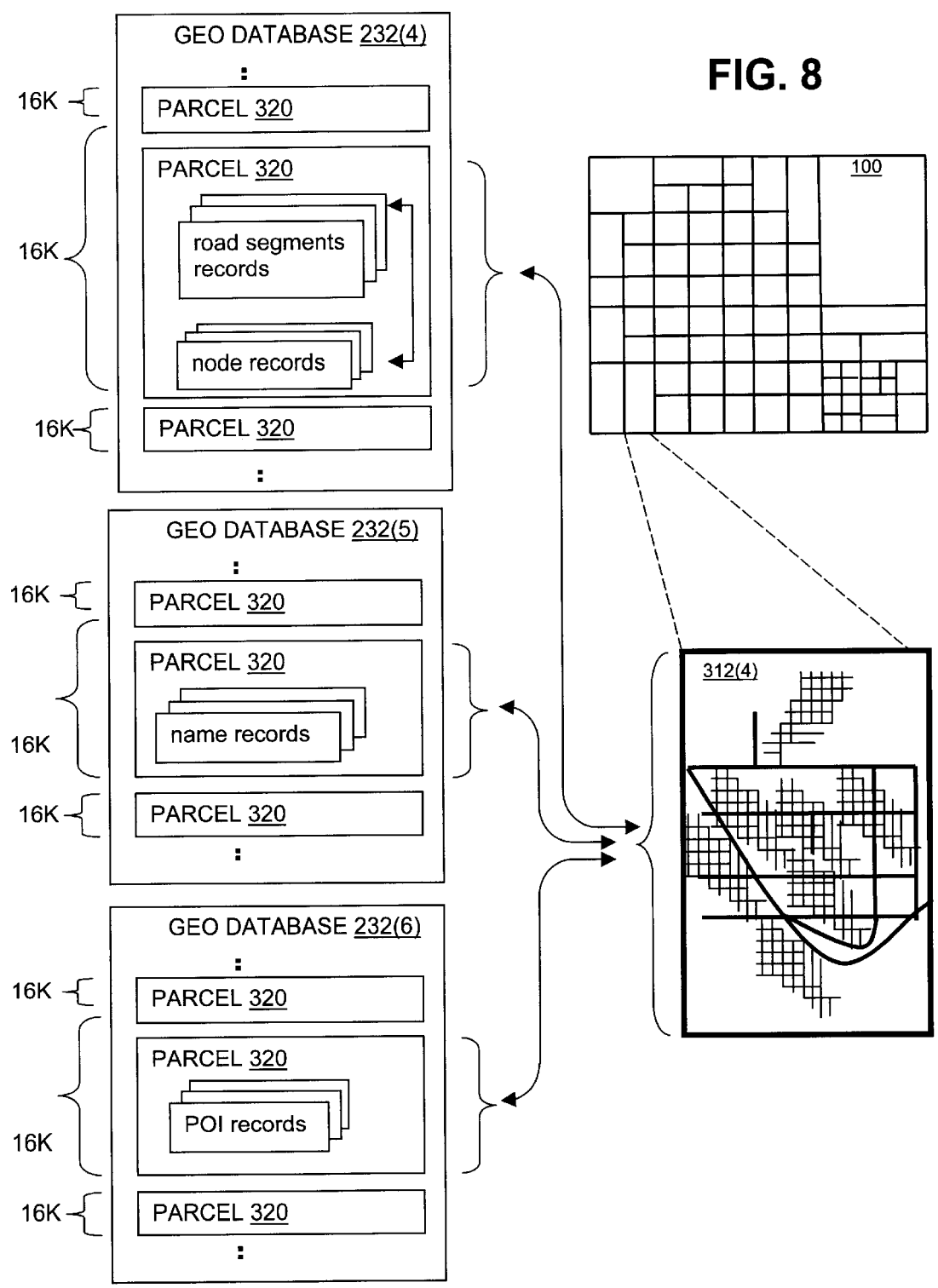
FIG. 8 is a diagram showing components of additional collections of geographic data contained in the downloadable geographic data storage shown in FIG. 4.

FIG. 8 shows three more data collections 232(4)(1), 232(4)(2), and 232(4)(3). In this embodiment, each collection 232(4)(1), 232(4)(2) and 232(4)(2) includes only some of the types (or attributes) of data. For example, the collection 232(4)(1) includes only routing data, e.g., segment and node records. The collection 232(4)(2) includes only name records. The collection 232(4)(3) includes only point of interest records. Each of these collections 232(4)(1), 232(4)(2), and 232(4)(3) is organized into separate parcels 320 that correspond to separate respective geographic areas 312. Accordingly, a parcel 320 of the collection 232(4)(1) includes the segment and node records that represent the roads and intersections in the geographic area 312(4). The collection 232(4)(2) includes the name records that represent names of the geographic features and/or points of interest in the geographic area 312(4). The collection 232(4)(3) includes the point of interest records that represent the points of interest located in the geographic area 312(4). In the collections 232(4)(1), 232(4)(2), and 232(4)(3) of data in FIG. 8, each parcel 320 contains 16K of data (although another uniform data size may be used).

The embodiments of the different data collections shown in FIGS. 5-8 represent only some of the different types of collections of data that can be maintained in the downloadable geographic data storage (124 in FIG. 2) on the navigation services server 120. The downloadable geographic data storage 124 can include collections of data that have parcels of different sizes. In addition, the downloadable geographic data storage 124 can includes collections of data that have parcels that are organized other than spatially. For example, the downloadable geographic data storage 124 can include collections that have parcels of data organized alphabetically or by administrative hierarchy (e.g., city, county, state, and country).

III. The End Users' Computing Platforms

A. Overview

As mentioned above, each end user uses a computing platform (130 in FIG. 1) that obtains data from the navigation services server 120. Also as stated above, some navigation-related functions are performed locally on an end user's computing platform using the data that are obtained from the navigation services server 120. Because different end user computing platforms may have different hardware and software, the navigation-related functions that are performed on the end users' computing platforms may vary from one end user platform to another. Accordingly, in the section that follows, a configuration of an end user computing platform is described. It is understood that not all end user computing platforms may necessarily provide all the functions described below and that some end user computing platforms may provide additional or other functions.

Although the different end user computing platforms may have different hardware and software resources, all the end user computing platforms receive data from the navigation services server (120 in FIG. 1). Some or all the end user computing platforms receive geographic data from the downloadable geographic data storage 124 on the navigation services server 120. End user computing platforms 130 that receive geographic data from the downloadable geographic data storage 124 can use the memory management features, described below, to handle the parcels of data obtained from the navigation services server 120.

B. Components of the End User's Computing Platform

Figure 9:
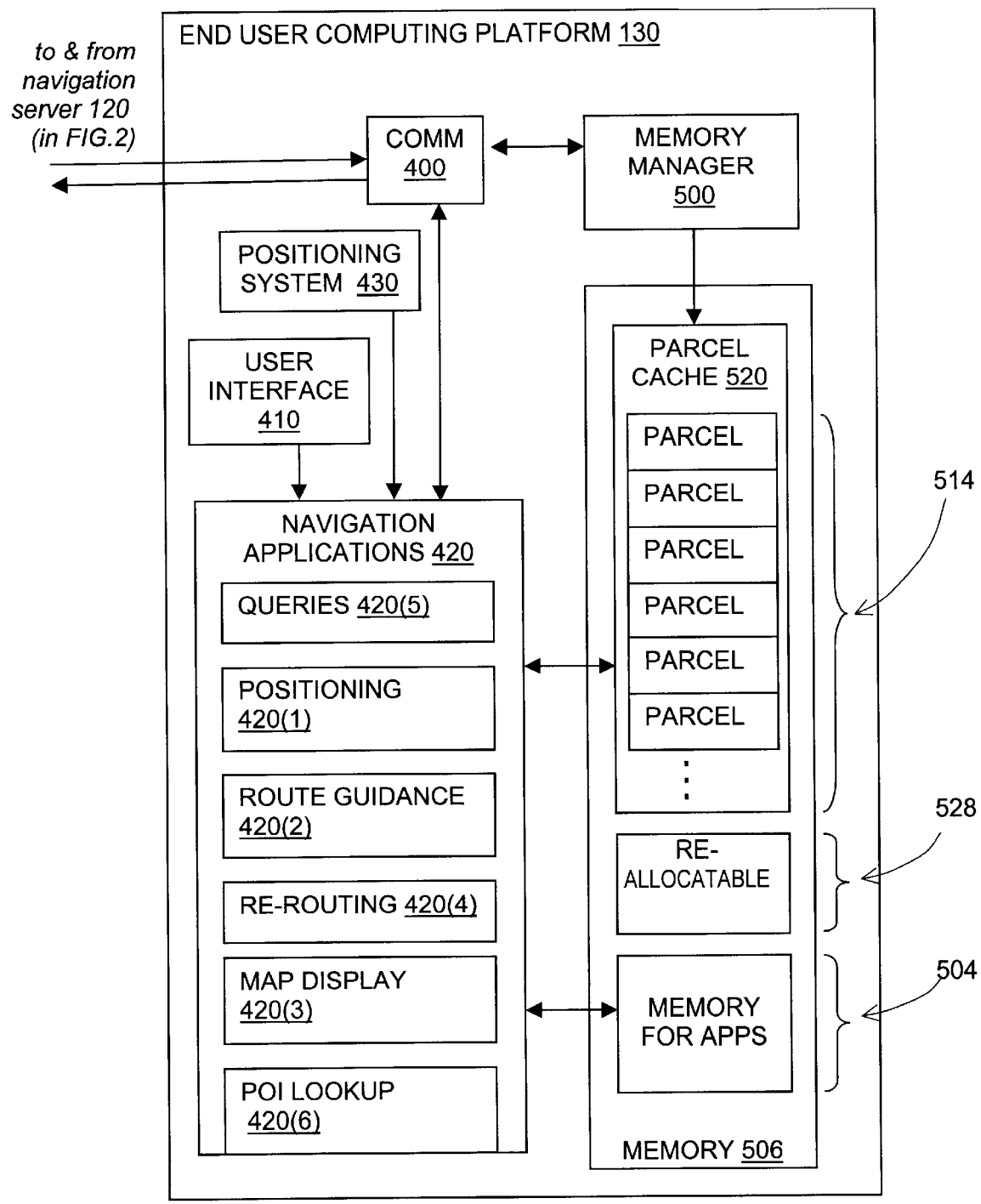
FIG. 9 is a block diagram showing components of one of the end user's computing platforms shown in FIG. 1.

FIG. 9 shows a block diagram of some of the components of one of the end user's computing platforms 130. The end user's computing platform 130 includes a communications system 400. The communications system 400 in the end user's computing platform 130 includes the hardware and software components needed to receive messages from and send messages to the navigation server (120 in FIG. 1) over the data network 170. The communications system 400 interfaces with other components in the end user's computing platform 130.

The end user's computing platform 130 also includes a user interface 410. The user interface 410 allows the end user to provide input to and receive information from the end user's computing platform 130. The user interface 410 includes hardware and software components. For example, the user interface 410 may include a display, a microphone, speakers, a keypad, or other kinds of means for inputting information into the computing platform and outputting information therefrom. The user interface 410 includes supporting software that may provide menus, prompts, audio, etc. The user interface 410 interfaces with other components in the end user's computing platform 130.

Included on the end user's computing platform 130 are navigation-related applications 420. The navigation-related applications 420 use the geographic data obtained from the navigation server 120 to provide various different types of navigation-related services. One of the navigation-related applications 420 is a positioning application 420(1). The positioning application 420(1) uses the geographic data obtained from the navigation server 120 to determine the position of the end user's computing platform 130 relative to data representing the road network. The positioning application 420(1) may also obtain data from a positioning system 430 which is part of the end user's computing platform 130. The positioning system 430 may use GPS, dead-reckoning, or a combination of these or other technologies to determine the location of the end user's computing platform 130. Methods for performing positioning are disclosed in U.S. Pat. No. 6,192,312, the entire disclosure of which is incorporated herein by reference. The positioning application 420(1) is optional, i.e., not all end users' computing platforms may provide for or support positioning.

Another of the navigation applications 420 on the end user's computing platform is route guidance 420(2). The route guidance application 420(2) uses data from the navigation server 120 to provide instructions for the end user to travel to a desired destination. Methods for performing route guidance using geographic data are disclosed in U.S. Pat. No. 6,199,013, the entire disclosure of which is incorporated herein by reference.

Another of the navigation applications 420 on the end user's computing platform is map display 420(3). The map display 420(3) uses data from the navigation services server 120 to provide maps graphically on the display screen of the user interface 410 of the end user's computing platform. The maps may show the area around the location of the end user's computing platform, the area along a route that the end user is following, the area around a location specified by the end user, or any other specified area. Methods for performing map display using geographic data are disclosed in U.S. Pat. Nos. 6,092,076 and 6,163,749, the entire disclosures of which are incorporated herein by reference.

Another of the navigation applications 420 on the end user's computing platform is a re-routing application 420(4). The re-routing application 420(4) is used when the end user departs from a route to a destination for which the end user was receiving guidance for following. The re-routing application 420(4) uses data from the navigation server 120 to calculate a new route to the destination or back to an original route. The re-routing application 420(4) may use the same methods for performing route calculation that are described in U.S. Pat. No. 6,129,314, the entire disclosure of which is incorporated herein by reference.

Another of the navigation applications 420 on the end user's computing platform is a query application 420(5). The query application 420(5) is used to formulate queries (i.e., requests for information) for the navigation applications (216 in FIG. 2) on the navigation services server 120. The query may be a request to calculate a route using the route calculation application 220, a request for information about a business, person, or point of interest using the finder services 224, or any other service or application provided by the navigation services server 120. The query application 420(5) manages sending a message to the navigation services server 120, waiting for a response, receiving the response, and then using the requested data locally, e.g., in local applications 420.

Another of the navigation applications 420 on the end user's computing platform is a point of interest look up application 420(6). The point of interest look up application 420(6) is used to look up (i.e., find) points of interest. The data describing the points of interest may be stored on the navigation services server 120 or locally.

C. Memory Management Functions on the End User's Computing Platform

The end user's computing platform 130 includes a memory manager application 500. The memory manager application 500 manages the memory resources of the end user's computing platform 130. Among the functions performed by the memory manager application 500 is management of the geographic data that are received from the navigation server 120. As part of this function, the memory manager application 500 manages the parcels 320 of geographic data that are received by the end user's computing platform 130 from the downloadable geographic data storage 124 on the navigation services server 120. Methods for managing parcels of geographic data in a memory are disclosed in U.S. Pat. Nos. 6,073,076 and 6,047,280, the entire disclosures of which are incorporated herein by reference.

Referring to FIG. 9, the memory manager application 500 reserves a portion 504 of the memory 506 of the end user's computing platform 130 for use by the navigation-related applications 420 and reserves another portion 514 for use as a parcel cache 520. The memory manager application 500 may determine the sizes of these portions 504 and 514 at the time of initialization of the end user's computing platform 130, or any time thereafter. This determination may take into account the total amount of installed memory that is available. In addition, the memory manager application 500 may determine a portion 528 of the memory 506 to be re-allocatable. Some or all of this re-allocatable portion 528 may be used alternately for the navigation applications 420 or for the parcel cache 520. Use of the re-allocatable portion 528 is determined during runtime of the end user's computing platform 130 by the memory manager application 500 based on the needs of the end user.

During operation of the end user's computing platform 130, the navigation-related applications 420 on the end user's computing platform 130 use the data contained in the parcels 320 that are downloaded from the navigation services server 120. To improve performance of the end user's computing platform 130, the cache 520 is provided in the memory 506 of the end user's computing platform 130. The cache 520 is specifically used for storing a number of parcels 320 of geographic data that have been downloaded from the navigation services server 120. Storing parcels of geographic data in the cache 520 supports the navigation-related applications 420 on the end user's computing platform 130 by maintaining a number of parcels in memory ready for use. Having parcels in memory ready to use avoids the relatively large delay associated with obtaining the parcels from the navigation services server 120. The parcel cache 520 may also be used to store parcels of geographic data that a navigation function predicts will be needed soon. As stated above, the formation and operation of the parcel cache 520 is performed by the memory manager application 500.

The size of the parcel cache depends upon several factors. One factor that affects the size of the parcel cache is the size(s) of the parcels. The size of the parcel cache relative to the size of the parcels determines how many parcels can be contained in the parcel cache. As mentioned above, in some embodiments, the parcels are stored in regular sizes, e.g., 2K, 4K, 8K, 16K, 32K, and so on, in the downloadable geographic data storage 124 on the navigation services server 120. Accordingly, the size of the parcel cache 520 on the end user's computing platform defines the number or parcels that can be stored locally. For example, a 384 K parcel cache can store a maximum of 24 parcels each 16K in size. Correspondingly fewer parcels of larger sizes can be stored and correspondingly more parcels of smaller sizes can be stored. In one embodiment, the parcel cache 520 is used to hold parcels of all the same size or in an alternative embodiment, the parcel cache 520 can hold parcels of varying sizes.

Another factor that affects the size of the parcel cache is the total available memory resources of the end user's computing platform 130. Computing platforms with limited memory resources may provide a relatively small portion for the parcel cache, whereas computing platforms with greater memory resources may provide relatively more memory for a parcel cache.

Still another consideration that affects the amount of memory used for the parcel cache 520 is the relative sizes of the memory 514 allocated to the parcel cache 520 and the memory 504 allocated to the navigation applications 420. A relatively large allocation of memory for the parcel cache 520 may not necessarily improve performance of an end user's computing platform if the amount of memory 504 available for the navigation applications 420 is constrained, and vice versa. The memory manager application 500 may include algorithms that determine an appropriate balance between the allocation of memory for the navigation applications 420 and the allocation of memory for use by the parcel cache.

If a parcel needed by a navigating application is not in the parcel cache 520 (as determined by the memory manager 500), the memory manager 500 requests the parcel from the navigation services server 120.

IV. Operation

A. Route Guidance (1) Overview

Figure 10:
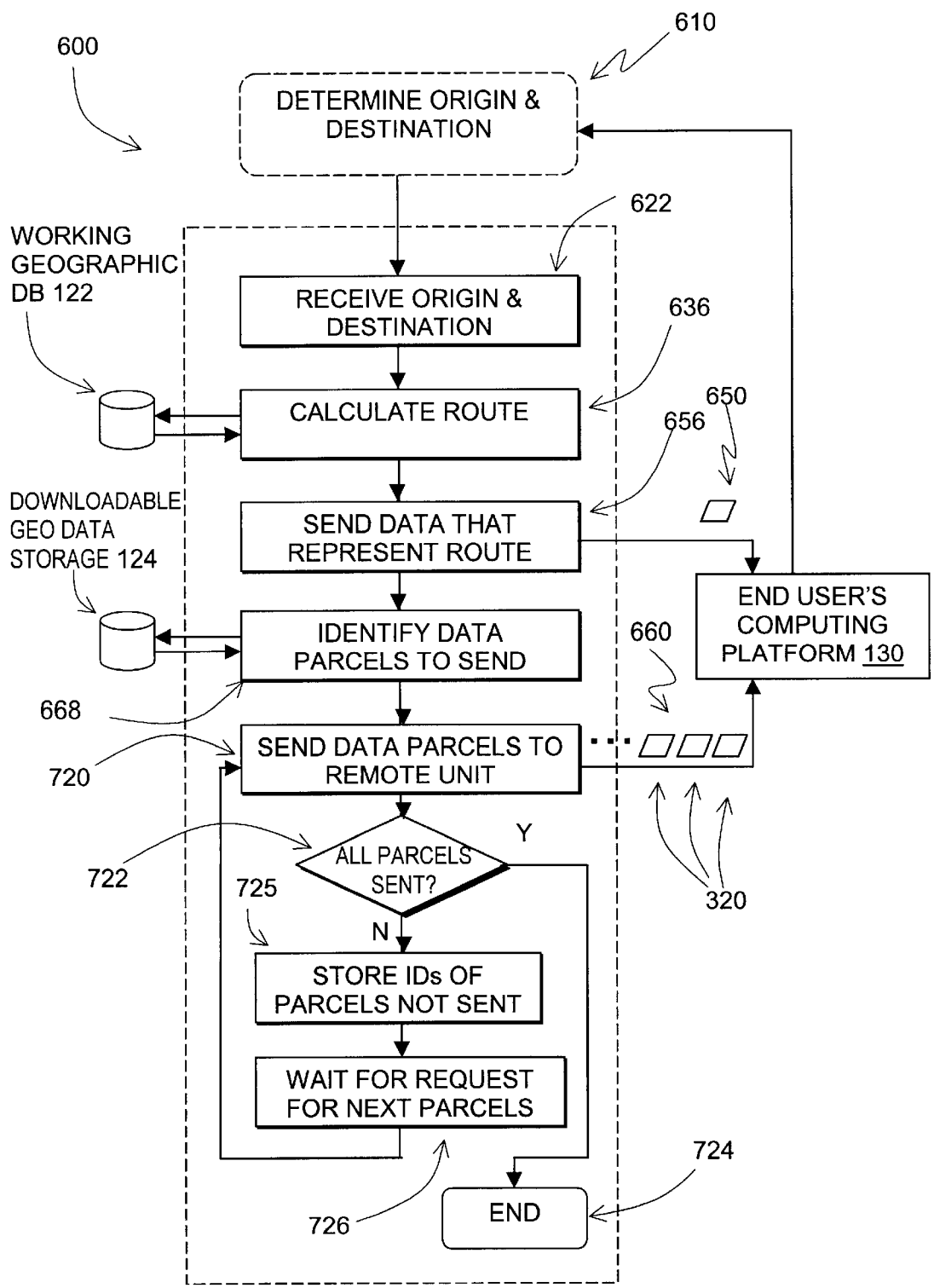
FIG. 10 is a flowchart showing steps in a process performed on the navigation services server of FIG. 1.

One of the functions performed by the navigation system 110 is route guidance. Route guidance includes providing an end user with instructions to reach a desired destination. FIG. 10 is a flow chart that shows the steps in a process 600 performed by the navigation system 110 of FIG. 1 for providing an end user with information for following a route to a desired destination.

(2) Functions Preceding Route Guidance a. Destination Selection

Route guidance may be associated with, or preceded by, one or more other functions performed by the navigation system 110. Before the information for following a route is provided to the end user, there is a step in which the origin and destination of the route are determined (Step 610 in FIG. 10). Determination of a destination may involve providing the end user with a means to select a location in the geographic region 100. Destination selection may include specification of a street address, street intersection, map location, or other location identification means. Alternatively, destination selection may include identification to the end user of locations that meet an end user's specified criteria or category, e.g., restaurants of a particular type within a specified distance of a location.

In the embodiment of FIGS. 1 and 10, the function of destination selection may be performed using a combination of locally available data, hardware or software and remotely located data, hardware or software. According to one embodiment, an end user uses locally available hardware and software (e.g., the query application 420(5) in FIG. 9) on his/her computing platform 130 to access the finder application (224 in FIG. 2) on the navigation services server 120. The end user uses this combination of local hardware and software and remote hardware and software to access the working database 122 on the navigation services server 120 to identify a location as a destination. The destination may be an address, a person's name, a business address, or a business name. Alternatively, the end user may use the finder application (224 in FIG. 2) to find a person, business, or point of interest by location, e.g., the bank that is closest to a specified location.

In some cases, the end user may first use the positioning application (420(1) in FIG. 9), which is located locally on the end user's computing platform, to identify his/her current location, and then specify this location to the finder application 224 on the navigation services server 120 to use in a location-based search for persons, businesses, or points of interest.

In an alternative embodiment, an end user may use locally available data, hardware and software to determine a destination. According to another alternative, the function of destination selection may be performed on the end user's computing platform using locally available hardware and software but using data which have been obtained from the remotely located navigation services server.

b. Specification of Origin

In order to calculate a route, a starting point (i.e., origin) is also required. In some cases, the end user's current location may be used as the origin. The end user's current location can be determined using the positioning application 420(1) which is located locally among the navigation applications 420 on the end user's computing platform 130. When performing this function, the positioning application 420(1) may use locally available data. These locally available data may be part of a geographic database stored on-board the end user's computing platform. Alternatively, the locally available data have been previously obtained from the navigation services server 120 in response to a prior request made by the end user using the query application 420(5). According to another alternative, the starting location may be determined in the same manner as the destination. According to another alternative, the end user's current location can be specified using coordinates determined using the positioning system (430 in FIG. 9) in the end user's computing platform. According to yet another alternative, the user can explicitly indicate where the route is to start. This is equivalent to destination selection as explained above.

(3) Route Calculation

After the origin and destination are specified, the process 600 includes a step in which the data indicating the origin and destination are received in the route calculation application 220 on the navigation server 120 (Step 622 in FIG. 10). As mentioned above, the route calculation application 220 determines a solution route, which is a legally valid, continuous series of roads (or segments thereof) between the specified origin and destination (Step 636 in FIG. 10). The route calculation application 220 uses the data in the working geographic database 122. Operation of the route calculation application 220 has been described above. When the solution route has been calculated, a series of roads, or segments thereof, are identified that form a continuous, legally valid route from the origin to the destination.

Figure 11:
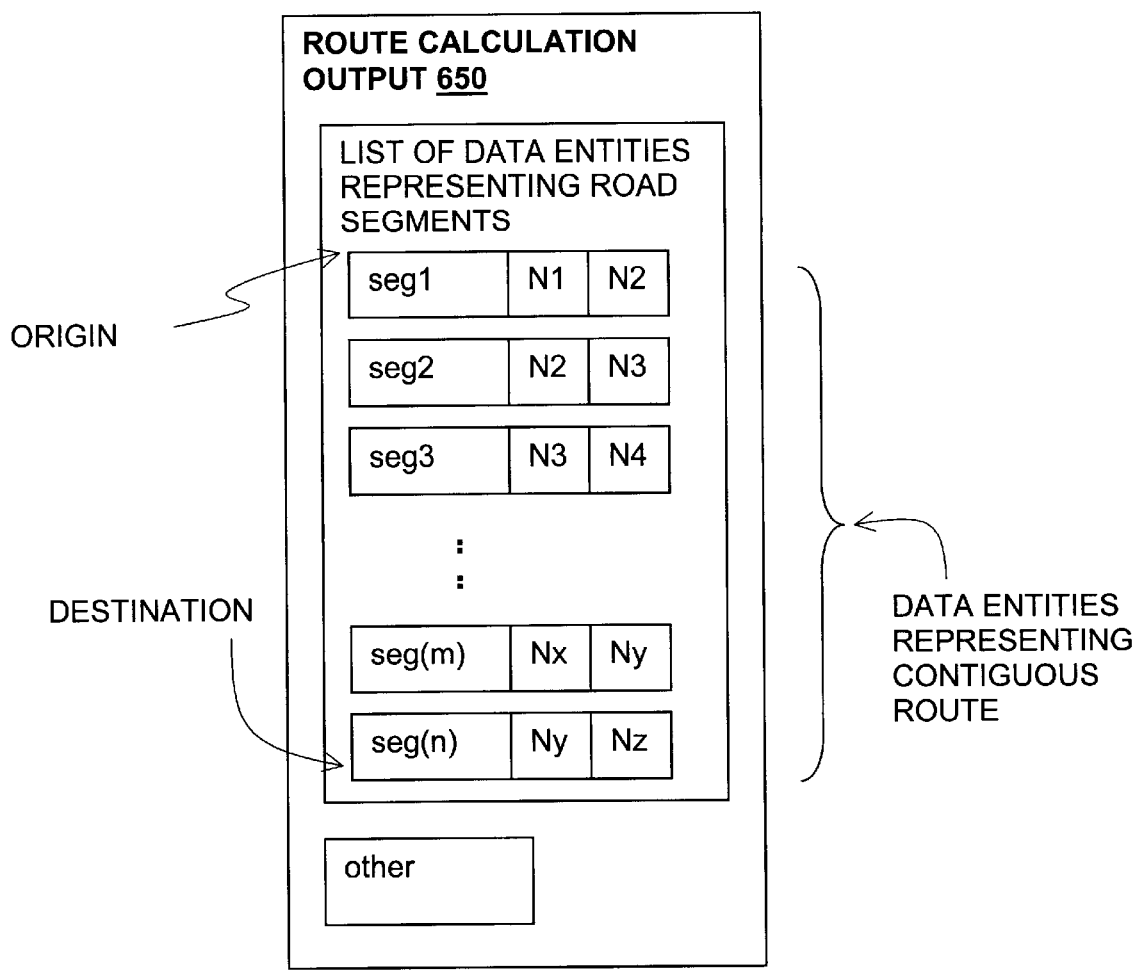
FIG. 11 is a block diagram showing components of the routing data that are sent from the navigation services server to the end user's computing platform according to the process shown in FIG. 10.

After the route calculation application 220 has calculated a solution route, an output 650 is provided. FIG. 11 is a diagram representing the components of the output 650 of the route calculation application 220. The route calculation output 650 contains an ordered list identifying a plurality of road segments. In FIG. 11, the plurality of road segment are identified by data entity IDs. These IDs are assigned to the data entities that represent these road segments by the developer of the working geographic database 122. The plurality of road segment data entities in the output 650 of the route calculation application 220 are labeled, seg1, seg2, seg3 . . . seg(n). The plurality of data entities represent the road segments that form the continuous navigable route between the origin and the destination that has been calculated by the route calculation application 220. Instead of using data entity IDs, the route calculation application 220 may use any other means for identifying the road segments that make up the solution route.

The route calculation output 650 may include other information in addition to the list of road segments.

(4) Providing the Route (and Additional Data) to the End User

After the solution route has been calculated by the route calculation application 220 on the navigation services server 120, the navigation services server 120 sends data to the end user's computing platform 130 so that guidance for following the solution route can be provided to the end user. The navigation services server 120 sends two kinds of data to the end user's computing platform 130. First, the navigation services server 120 sends to the end user's computing platform 130 the output 650 of the route calculation application 220 that indicates the road segments that form the solution route (Step 656 in FIG. 10). In addition to the data 650 indicating the solution route, the navigation services server 120 also sends additional data 660 relating to the solution route. The additional 660 data relating to the solution route are used in combination with the data 650 indicating the solution route to provide the end user with meaningful guidance for traveling the route.

The additional data 660 that are sent by the navigation services server 120 to the end user's computing platform 130 are obtained from the downloadable geographic data storage 124. After the solution route has been calculated (in Step 636), the geographic data providing application (228 in FIG. 2) determines which data from the downloadable geographic data storage 124 to send to the end user's computing platform 130 (Step 668 in FIG. 10). As mentioned above, the data contained in the downloadable geographic data storage 124 are organized into a plurality of collections 232, each of which is organized into a plurality of parcels (320 in FIG. 4). Thus, when determining which geographic data to send to the end user's computing platform 130, the geographic data providing application 228 determines which parcels 320 of data from a particular collection 232 to send.

As mentioned above, the determination of which collection 232 to use when sending geographic data can be determined in several different ways. One way is to have an application on the end user's computing platform identify the collection from which data are to be sent. The collection 232 can be identified by ID or by description. Alternatively, the geographic data providing application 228 may query the subscriber database 208 in FIG. 2 to determine which collection 232 to use for a particular end user. Alternatively, the geographic data providing application 228 may use one collection by default. Any other means may be used to determine the appropriate collection to use.

In addition to specifying which collection 232 to use when sending geographic data, an application in the end user's computing platform may also indicate to the geographic data providing application 228 the memory resources that are available on the end user's computing platform for storing the data received from the navigation services server. Alternatively, the size of the memory resources available on the end user's computing platform can be stored as a configuration parameter in the subscriber database 208 in FIG. 2, or according to another alternative, a default memory size can be used.

Figure 12:
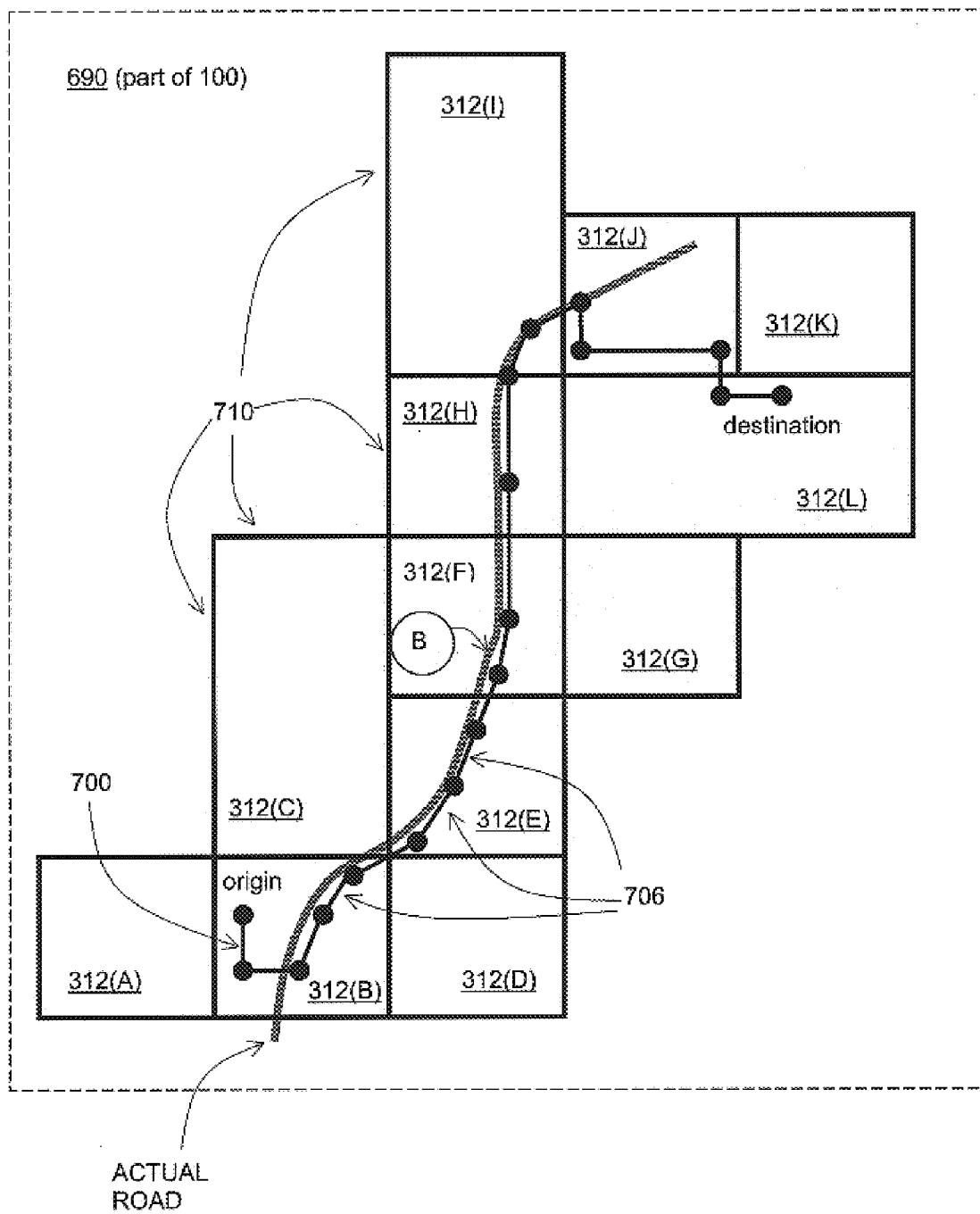
FIG. 12 is a map used to illustrate part of the process of FIG. 10.

After the collection 232 of data to use is determined, the specific parcels 320 in the collection 232 are selected. FIG. 12 illustrates how the geographic data providing application 228 determines which parcels of data to send to an end user's computing platform. FIG. 12 shows a map 690 of a portion of the region 100. A route 700 is shown on the map 690. The route 700 is shown as a plurality of connected road segments 706. Also shown on the map 690 are the outlines 710 of geographic areas 312(A)–312(L). As described above, each of these geographic areas 312(A)–312(L) encompasses the geographic features that are represented by the data contained in a separate parcel 320 of data into which the entire collection 232 of geographic data is divided. Using the locations of the road segments in the solution route 650, as calculated by the route calculation application 220, the geographic data providing application 228 identifies the geographic areas 312 that are crossed by the solution route or that are within a specified distance from the road segments in the solution route. (The specified distance may be configurable.) The geographic areas that are crossed by or close to the solution route may be determined by any suitable means. For example, the route calculation application 220 may store IDs of these geographic areas (or IDs of the parcels themselves), as the solution route is being calculated.

Once the geographic areas 312(A)–312(L) that are crossed by or close to the solution route are determined, the parcels 320 that contain the data that represent the geographic features encompassed in these geographic areas are identified for sending to the end user's computing platform 130.

When the geographic data providing application 228 sends the parcels corresponding to the solution route to the end user's computing platform, the parcels are sent in the order in which they correspond to the route, starting from the origin. In this way, the end user's computing platform first receives the parcels that contain the data that represent the features around the origin and then receives the parcels that contain the data that represent the features along the subsequent portions of the route.

When sending the parcels corresponding to the solution route to the end user's computing platform, the geographic data providing application 228 may send all the parcels corresponding to the solution route to the end user's computing platform immediately. Alternatively, the geographic data providing application 228 may send only some of the parcels initially and then send the remainder of the parcels at one or more subsequent times. If the end user's computing platform has sufficient memory resources to hold all the parcels identified as corresponding to the solution route, the geographic data providing application 228 may send all the parcels immediately to the end user's computing platform. However, if the end user's computing platform does not have sufficient memory resources to hold all the parcels identified as corresponding to the solution route, the geographic data providing application 228 sends only the number of parcels that the end user's computing platform can hold in memory. The parcels that are sent initially by the geographic data providing application 228 correspond to the initial portion of the route. When the geographic data providing application 228 initially sends only some of the parcels corresponding to the solution route, the geographic data providing application 228 maintains a list identifying the parcels that were not sent. According to this embodiment, after the end user has proceeded along the route through the areas represented by the parcels that were initially stored in memory, the end user's computing platform requests the navigation services server to send those parcels corresponding to the next portion of the route. The list of parcels corresponding to the solution route maintained by the geographic data providing application 228 is used to quickly identify which parcels to send next to the end user's computing platform.

Referring back to the process 600 in FIG. 10, if all the parcels corresponding to the solution route are sent to the end user's computing platform, the process ends (Steps 722 and 724). If all the parcels corresponding to the solution route are not sent to the end user's computing platform (e.g., if the end user's computing platform does not have enough memory to hold all the parcels), data identifying the parcels that are not sent are stored (Step 725). Then, the process waits until the end user's computing platform requests the parcels corresponding to the next portion of the route (Step 726). When the request for the next portion of the route is received, additional parcels of data are sent to the end user's computing platform (Step 720, again). These steps are repeated until all the parcels corresponding to the solution route are sent (Steps 722 and 724).

(5) Providing Navigation-Related Functions on the End User's Computing Platform

FIG. 13 shows a process 750 performed on the end user's computing platform when it receives the data 650 indicating the route and the additional data 660 from the navigation services server 120. First, the data 650 and 660 are received in the end user's computing platform (Step 760).

The memory manager application 500 reserves a portion of the memory of the end user's computing platform for use as a parcel cache 520, if it has not done so already (Step 764). When forming the parcel cache, the memory manager application 500 takes into account the size of the parcels that will be received. For example, if the parcels are 64K in size, the memory manager application 500 may reserve 1280K of memory, which will be enough to hold 20 parcels. The memory manager application 500 stores the additional data 660, which are in the form of parcels 320, in the parcel cache 520 (Step 770).

The parcel cache 520 formed by the memory manager application 500 may not be large enough to hold all the parcels for the entire route. If this is the case, the memory manager application 500 stores the parcels in the order in which they are sent by the navigation services server 120 and stops storing any more parcels when the parcel cache is full. In this way, the parcels of additional data 660 corresponding to the beginning of the route are stored in the parcel cache. The parcels of additional data 660 corresponding to subsequent parts of the route are not stored in the parcel cache at this time. The memory manager application 500 may send a message to the geographic data providing application 228 indicating the size of the cache (or the number of parcels that can be stored). Alternatively, the memory manager application 500 may send a message to the geographic data providing application 228 to stop sending parcels when the parcel cache is full.

On the end user's computing platform, the data 650 indicating the solution route are not stored in the parcel cache 520. Instead, the data 650 indicating the solution route are stored in the working portion of memory (504 in FIG. 9), where the data are used by the various navigation applications 420 on the end user's computing platform 130.

On the end user's computing platform, the navigation applications (420 in FIG. 9) use the additional data 660 relating to the solution route, in combination with the data 650 indicating the solution route, to provide navigation-related functions (Step 776). For example, the route data 650 and the additional data 660 may be used by the route guidance application 420(2) on the end user's computing platform 130 to provide maneuvering instructions at specific locations along the solution route. As an example, the route guidance application 420(2) uses the route data 650 and the additional data 660 to provide a maneuvering instruction, such as "TURN LEFT AT THE NEXT INTERSECTION." These additional data 660 may be used to provide these instructions as text on a display screen or as audible instructions.

According to another example, the route data 650 and the additional data 660 relating to the solution route may be used by the map display application 420(3) on the end user's computing platform 130 to provide a map of the route on the display screen of the user interface (410 in FIG. 9) of the end user's computing platform. The map of the route may be in the form of a "strip map."

According to yet another embodiment, the route data 650 and the additional data 660 may be used to indicate the positions of road segments that are not part of the solution route but that are close to the solution route. These data can be used by vehicle positioning hardware and software, e.g., the positioning application 420(1), in the end user's computing platform to determine whether the end user has departed from the solution route, and if so, how to travel back to the solution route (e.g., using the re-routing application 420(4)).

As mentioned above, it may not be possible to store initially all the data parcels 320 that relate to the entire solution route represented by the data 650. If this is the case, only the parcels that contain the data that represent the geographic features along a first portion of the route are stored initially in the parcel cache on the end user's computing platform. Then, after the end user has traveled part way along the route, the end user will eventually approach the location at which the coverage of the data in the parcel cache ends. For example, referring again to FIG. 12, if the parcel cache on the end user's computing platform has room for only six parcels of data, the six parcels corresponding to the areas 312(A)–312(F) would be stored initially in the parcel cache. Then, after the end user has traveled along the route to the point labeled B, the end user would be close to the location at which the coverage of the additional data stored in the parcel cache ends. When the end user is at this point, the query application 420 on the end user's computing platform sends a new request for navigation-related services and data to the navigation services server 120 (Steps 790 and 792). This new request may reference the prior request or may be handled as a request for new route.

According to one method, when the end user's computing platform approaches the end of the coverage areas corresponding to the parcels contained locally in its parcel cache and requests more parcels from the navigation services server (Step 792), this new request may reference the prior request. If the new request references the prior request, the process on the navigation services server uses the list identifying the parcels that were not previously sent to the end user's computing platform (in Step 725 in FIG. 10) to determine which parcels to send next. These parcels are obtained from the downloadable data storage 124 and sent to the end user's computing platform. When these new parcels are received on the end user's computing platform, the process 750 starts over at Step 760.

According to an alternative method, when the end user's computing platform approaches the edge of the coverage areas corresponding to the parcels contained locally in its parcel cache and requests more parcels from the navigation services server (Step 792), the request may be handled by the navigation services server as a request for an entirely new route. The navigation services server performs the process 600 in FIG. 10, starting at Step 622. The navigation services server 120 uses the route calculation application 220 to calculate a new route to the destination using the point B as a new origin (Step 636 in FIG. 10, again). By treating the request for the next leg of the route as a request for a new route, the route calculation application 220 on the navigation services server may take into account any changes in traffic conditions that may have occurred since the prior route was calculated. The navigation services server 120 then sends the new route (in the form of new route data 650) and parcels of new additional data 660 (in the form of parcels) to the end user's computing platform (Steps 656 and 720 in FIG. 10, again). When the new route data 650 and new additional 660 data are received on the end user's computing platform, they are treated as an entirely new route. The parcels that had been stored in the parcel cache are replaced with the new parcels that are received that relate to the next leg of the route.

B. Map Display without Route Guidance

In another embodiment, the end user may request geographic data for map display without necessarily requesting a route. For example, an end user may want to have a map display of the area around his/her present location. In this case, the end user operates his/her computing platform to request a map display around his/her geographic location. The end user may use the query application 420(5) for this purpose. The end user may specify his/her location or alternatively, the query application 420(5) may obtain from the positioning system 430 (if present), data that indicates the end user's current position and include this information in the request for map display data.

The request for map display data is handled on the navigation services server 120 in a similar way as the request for route information, described above. In this case, a route does not have to be calculated. The navigation services server identifies the parcels that contain the geographic data that represent the features around the specified location. Then, the navigation services server sends these parcels to the end user's computing platform, as described above. On the end user's computing platform, these parcels are handled in a similar manner as described above in connection with FIG. 14.

Instead of requesting map data for his/her end user's current location, the end user may request map data for any location. The end user may use any suitable means to identify the location for which map data are desired.

C. Other Functions

Any of the functions provided on the end user's computing platform may be provided in combination with each other or separately. For example, the positioning function (i.e., using the positioning application 420(1) in FIG. 9) may be performed without the map display or route guidance functions.

III. Alternative Embodiments

A. Selection of Data Collection Based on Function

In connection with FIG. 8, collections of data were described that were organized by type (or function). Various types and functions of data collections may be provided. For example, different collections of data may be provided for route guidance, map display, vehicle positioning, audio data, non-audio data, etc. When an end user computing platform requests geographic data, the type of data are indicated to the navigation services server. The type can be specified depending upon the resources supported by the end user's computing platform. The type can also be specified depending upon the function that the end user's platform needs the data to perform. For example, if the end user intends only to perform map display and not route guidance, the end user's computing platform may specify that data from the map display collection be sent. In this manner, the end user's computing platform is not sent data that it does not need, thereby allowing more data of the specified type to be sent.

B. Data Collections Based on Layer

In addition to the types of data collections (232 in FIGS. 5–8) described above, the downloadable data storage 124 in FIG. 2 can include collections based on layer. Collections based on layer use a ranking assigned to roads in a geographic region. The ranking can be related to a functional classification of the roads. Major roads upon which travel is generally faster are assigned a higher ranking and minor roads upon which travel is generally slower are assigned a lower ranking. Using these rankings, data representing the higher ranked roads are stored in one or more separate collections from the lower ranked roads.

C. Downloading of Applets and Plug-Ins

In addition to data representing a route and additional data representing geographic features along the route (or around another location), there are other kinds of data and information that the end user computing platforms may obtain from the navigation services provider. According to one embodiment, the navigation services provider may send navigation applications to an end user's computing platform. The navigation applications that the navigation services server sends to the end user's computing platform may be new applications or updates for prior versions of the navigation applications. The navigation applications that the navigation services provider sends may include any of the applications that are run on the end users' computer platforms, including route guidance, map display, positioning, query services, re-routing, memory management, etc. In one embodiment, these navigation applications are sent as applets or plug-ins. Referring again to FIG. 2, in one embodiment, the navigation services provider 128 maintains navigation applets (or plug-ins) 800 in a downloadable storage 802 on the navigation services server 120. Then, upon request from an end user, the navigation services server 120 sends the navigation applet or plug-in to the end user's computing platform. The applet or plug-in can be used in the end user's computing platform. The applet or plug-in can be used with another application installed on the end user's computing platform, such as a browser. In this embodiment, the end user identifies the type of navigation function that is desired and then the navigation services server sends the navigation applet (or plug-in) as well as the data to be used by the applet (or plug-in). As an example, if the end user wants to obtain route guidance, the navigation services server sends a route guidance applet, data indicating the route, and additional data representing the geographic features along the route. The route guidance applet, when downloaded into the end user's computing platform and properly installed, operates similarly to the route guidance application (420(2) in FIG. 9). In this manner, both the software and the data for a function desired by the end user can be provided from the navigation services provider.

IV. Advantages

Several advantages follow from embodiments of the disclosed systems.

As mentioned above, the navigation system 110 supports many different kinds of end user computing platforms. If a navigation server had to determine the appropriate type of data to send to each different type of computing platform, it would place a considerable burden on the navigation server. Accordingly, the navigation server uses pre-computed data parcels, thereby facilitating this process.

The pre-computed data parcels are designed to be handled as the minimum size units of data that are transferred from the navigation server to the end users' computing platforms for use therein. Because the pre-computed parcels have a uniform size, the end user's computing platform can manage them easily.

Another advantage follows from having a separate working database (122 in FIG. 2) used by the navigation services server and downloadable geographic data (124 in FIG. 2) for use by the end user computing platforms. The working database can be optimized for use by the server and the data contained in the downloadable geographic data storage can be optimized for use by the end users' computing platforms.

Another advantage of the disclosed embodiments is that the pre-computed data parcels that are sent from the navigation services provider to the end users can be ensured to have connectivity. When data representing features along a route are sent to an end user, it is preferred that all the road segments that can be reached by the end user are represented. This can involve a significant amount of processing. Using any of the disclosed embodiments, when the pre-computed data parcels are formed, the connectivity of all the represented roads can be ensured.

It is intended that the foregoing detailed description be regarded as illustrative rather than limiting and that it is understood that the following claims including all equivalents are intended to define the scope of the invention.

We claim:

1. A server that provides geographic data for client computing platforms comprising:

a repository for geographic data, wherein the repository contains data that represent geographic features located in a serviced geographic region, wherein the geographic region is divided into a plurality of pre-determined smaller sub-areas, wherein the data contained in the repository are organized into a plurality of substantially uniform-sized parcels of data, wherein each of said substantially uniform-sized parcels includes data that represent the geographic features located in separate respective one of the plurality of smaller sub-areas; and a data downloading application run on said server that downloads one or more of said whole substantially uniform-sized parcels of data from said repository to said client computing platforms, as needed, for used therein.

2. The invention of claim 1 further comprising:

a working geographic database associated with said server and used by a navigation application on said server to perform a navigation-related function.

3. The invention of claim 2 wherein the navigation related function is route calculation.

4. The invention of claim 1 further comprising:

a finder application associated with said server and adapted to find information about businesses based upon specific criteria.

5. The invention of claim 4 wherein the specified criteria include location-based criteria.

6. The invention of claim 4 wherein the finder application also finds information about persons.

7. The invention of claim 1 further comprising:

a subscriber services application associated with said sever and adapted to provide subscriber services to end users who access the said sever.

8. The invention of claim 1 wherein the repository includes a plurality of collections of geographic data, wherein each collection represents the entire geographic region, wherein each collection is organized into a plurality of parcels of a substantially uniform size, and wherein the parcels in one of said plurality of collections has a different substantially uniform size than the parcels in another of said plurality of collections.

9. The invention of claim 1 wherein the repository includes a plurality of collections of geographic data, wherein each collection represents the entire geographic region, wherein each collection is organized into a plurality of parcels of a substantially uniform size, and wherein the parcels in one of said plurality of collections contains data that represents different attributes of the represented geographic features than the parcels in another of said plurality of collections.

10. The invention of claim 1 wherein the server also includes a repository of downloadable applications for downloading and running on client computing platforms.

11. The invention of claim 10 wherein the downloadable applications are applets.

12. The invention of claim 10 wherein the downloadable applications are plug-ins.

13. The invention of claim 10 wherein the downloadable applications include a memory manager application.

14. The invention of claim 10 wherein the downloadable applications include updates for applications already installed on client computing platforms.

15. The invention of claim 10 wherein the downloadable applications are applets that run in a browser installed on a client computing platform.

16. A method of operation for a navigation system comprising:
  on a server, receiving a request for a navigation-related or map-related service from a client computing platform, wherein said navigation-related or map-related service includes at least one of: information about traveling along a road network, route calculation, route guidance, people or business finding services, maps, point of interest searching, and destination selection:
  using a plurality of pre-computed parcels of geographic data stored with said server to send to client computing platform to respond to said request, wherein each of the pre-computed parcels of geographic data in collection thereof corresponds to a separate one of a plurality of geographic sub-areas into which a geographic region is divided; and
  determining which geographic sub-areas are required for the navigation-related or map-related service;
  sending the pre-computed parcels of geographic data that correspond to the determined geographic sub-areas to the client computing platform.

17. The method of claim 16 further comprising:
  on said server, determining a route between an origin and a destination.

18. The method of claim 17 further comprising:
  sending data that indicates the route to the client computing platform.

19. The method of claim 17 wherein the step of determining comprises:
  identifying which of the geographic sub-areas are located along the route; and
  determining to send the pre-computed parcels of geographic data that represent the geographic sub-areas identified as being located along the route.

20. The method of claim 16 further comprising:
  selecting the collection from a plurality of different collections of pre-computed data parcels.

21. The method of claim 20 further comprising:
  receiving from the client computing platform an indication of which of said plurality of different collections to send data from.

22. The method of claim 20 wherein the step of selecting is preceded by accessing a subscriber database that indicates which collection to send data from.

23. An architecture for a navigation system comprising:
  a server;
  client computing platforms;
  a network over said client computing platforms and said server can communicate with each other;
  a geographic database associated with said server;
  a geographic data repository associated with said sever and containing substantially uniform-sized pre-computed parcels of geographic data, wherein each parcel in a collection represents geographic features located in a separate one of a plurality of geographic sub-areas into which a geographic region is divided; and
  a geographic data application on the server that determines which of said pre-computed parcels of geographic data of said client computing platforms in response to requests therefrom for a navigation-related or map-related service.

24. The invention of claim 23 wherein the collection is one of a plurality of collections of geographic data, each of which is organized into a plurality of pre-computed parcels, and wherein the plurality of pre-computed parcels in one of said plurality of collections has a different substantially uniform data size than the plurality of pre-computed parcels in another of said collections.

25. A method of managing memory resources in a client computing platform comprising the steps of:
  receiving substantially uniform-sized predetermined parcels of data from a server,
  wherein each substantially uniform-sized predetermined parcel of data contains data that represent geographic features located within a separate respective one of a plurality of sub-areas into which a geographic region is divided; and
  storing said substantially uniform-sized predetermined parcels of data in corresponding-sized portions of a cache memory in said client computing platform.

26. The method of claim 25 further comprising:
  using said substantially uniform-sized predetermined parcels of data to display a map on said client computing platform.

27. The method of claim 26 wherein said map is a strip map.

28. The method of claim 26 further comprising:
  showing a calculated route on said map.

29. The method of claim 25 wherein the sub-areas corresponding to said substantially uniform-sized predetermined parcels of data received by said client computing platform overlap a portion of a calculated route.

30. The method of claim 29 wherein the route is calculated on the server.

31. The method of claim 25 wherein the substantially uniform-sized predetermined parcels of data received by said client computing platform include separate types of data contained in separate substantially uniform-sized predetermined parcels of data.

32. The method of claim 25 wherein the substantially uniform-sized predetermined parcels of data received by said client computing platform include separate types of data contained in each substantially uniform-sized predetermined parcels of data.

33. The method of claim 25 further comprising:
  prior to receiving the substantially uniform-sized predetermined parcels of data from the server, on the client computing platform, identifying types of data needed to support functions provided by the client computing platform.

34. The method of claim 25 further comprising:
  using the data contained in said substantially uniform-sized predetermined parcels of data to provide route guidance.

35. The method of claim 25 further comprising:
  using the data contained in said substantially uniform-sized predetermined parcels of data to explicate a calculated route.

36. The method of claim 25 wherein the sub-areas corresponding to said substantially uniform-sized predetermined parcels of data received by said client computing platform overlap an initial portion of a calculated route; and as the client computing platform travels along the calculated route, obtaining additional substantially uniform-sized predetermined parcels of data corresponding to sub-areas that overlap subsequent portions of said calculated route.

37. The method of claim 25 further comprising:

determining a position of the client computing platform relative to roads represented by data contained in said substantially uniform-sized predetermined parcels of data received by said client computing platform.

38. The method of claim 25 further comprising:

determining whether said client computing platform has departed from a calculated route.

39. The method of claim 38 further comprising:

calculating a way back to said calculated route using data contained in said substantially uniform-sized predetermined parcels of data received by said client computing platform.

40. The method of claim 25 further comprising:

downloading an application from the server to be run on said client computing platform.

41. The method of claim 40 wherein the application downloaded from the server is an applet.

42. The method of claim 40 wherein the application downloaded from the server is a plug-in.

43. The method of claim 40 wherein the application downloaded from the server runs in a browser on the client computing platform.

44. The method of claim 26 further comprising:

receiving data from the server that indicates a route between an origin and destination, wherein the route was calculated on the server.

45. The method of claim 44 further comprising:

from the client computing platform, specifying the origin and destination to the server prior to receiving data from the server that indicates the route.

* * * * *